(12) United States Patent
Finan et al.

(10) Patent No.: US 11,683,149 B2
(45) Date of Patent: Jun. 20, 2023

(54) PRECISE TIME MANAGEMENT USING LOCAL TIME BASE

(71) Applicant: Apple Inc., Cupertino, CA (US)

(72) Inventors: Christopher D. Finan, Cupertino, CA (US); Alexander Ukanwa, Morgan Hill, CA (US); Charles F. Dominguez, San Carlos, CA (US); Jean-Didier Allegrucci, Sunnyvale, CA (US); Jeffrey J. Irwin, Cupertino, CA (US); Kalpana Bansal, San Jose, CA (US); Michael Bekerman, Los Gatos, CA (US); Remi Clavel, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 17/472,242

(22) Filed: Sep. 10, 2021

(65) Prior Publication Data

US 2022/0085969 A1 Mar. 17, 2022

Related U.S. Application Data

(60) Provisional application No. 63/077,486, filed on Sep. 11, 2020.

(51) Int. Cl.
*G06F 1/12* (2006.01)
*H04L 7/00* (2006.01)

(52) U.S. Cl.
CPC .............. *H04L 7/0016* (2013.01); *G06F 1/12* (2013.01); *H04L 7/0008* (2013.01)

(58) Field of Classification Search
CPC ................. G06F 1/32; G06F 1/12; G06F 9/44
See application file for complete search history.

(56) References Cited

U.S. PATENT DOCUMENTS

| | | | |
|---|---|---|---|
| 6,138,243 A * | 10/2000 | Mealey | G06F 1/14 713/400 |
| 8,190,942 B2 | 5/2012 | Simon et al. | |
| 8,428,045 B2 | 4/2013 | Gelter et al. | |
| 8,699,646 B2 | 4/2014 | Olsen et al. | |
| 9,432,456 B2 | 8/2016 | Stanton et al. | |
| 9,547,332 B1 * | 1/2017 | Mizrahi | H04J 3/0697 |
| 9,571,215 B2 | 2/2017 | Bock et al. | |
| 2011/0228888 A1 | 9/2011 | Getter et al. | |

(Continued)

OTHER PUBLICATIONS

Notice of Allowance in U.S. Appl. No. 17/482,178 dated Feb. 9, 2023, 10 pages.

*Primary Examiner* — Keshab R Pandey
(74) *Attorney, Agent, or Firm* — Kowert, Hood, Munyon, Rankin & Goetzel, P.C.; Erik A. Heter; Dean M. Munyon

(57) ABSTRACT

A method and apparatus for synchronizing a timebase is disclosed. A timebase management circuit includes limit circuitry, in a first clock domain, which generates, based on a global timebase, an initial timebase limit. The timebase management circuit includes, in a second clock domain, adjustment circuitry that generates an adjusted timebase limit based on the initial timebase limit. A storage circuit in the second clock domain stores a local timebase. Update circuitry, coupled to an output of the storage circuit, generates an updated local timebase using a clock signal in the second clock domain, wherein the updated local timebase is subject to the adjusted timebase limit.

20 Claims, 15 Drawing Sheets

(56) References Cited

U.S. PATENT DOCUMENTS

| | | | |
|---|---|---|---|
| 2013/0205160 A1* | 8/2013 | Turner | G06F 5/12 |
| | | | 713/400 |
| 2015/0078495 A1 | 3/2015 | Hossain et al. | |
| 2016/0139625 A1 | 5/2016 | Worrell et al. | |
| 2018/0227067 A1 | 8/2018 | Hu et al. | |
| 2019/0294711 A1 | 9/2019 | Castro et al. | |
| 2019/0332137 A1* | 10/2019 | Benjamini | G06F 13/4282 |
| 2019/0361486 A1 | 11/2019 | Malik et al. | |
| 2019/0386761 A1 | 12/2019 | Lewis | |
| 2022/0045777 A1 | 2/2022 | Amicangioli et al. | |
| 2022/0050495 A1 | 2/2022 | Bismuth et al. | |

\* cited by examiner

PRECISE TIME MANAGEMENT USING LOCAL TIME BASE

PRIORITY CLAIM

The present application claims priority to U.S. Prov. Appl. No. 63/077,486, filed Sep. 11, 2020, which is incorporated by reference herein in its entirety.

BACKGROUND

Technical Field

This disclosure is directed to computer systems, and more particularly, to keeping accurate time in the various components of a computer system.

Description of the Related Art

In digital systems, real time (or "wall clock time") is represented by a timebase. Typically, the timebase is reset to zero at system startup, and is incremented according to a clock in the system. If the real time at the system startup is known (usually maintained in software), then the timebase value can be added to the real time to determine the current time.

For larger systems or integrated circuits therein, a global timebase bus may be used to send a global timebase across the SoC to locations at which access to the timebase is needed. Similarly, the global timebase may also be forwarded to peripheral devices in the system.

SUMMARY

A method and apparatus for synchronizing a timebase is disclosed. In one embodiment, a timebase management circuit includes limit circuitry, in a first clock domain, which generates an initial timebase limit based on a global timebase. The timebase management circuit includes, in a second clock domain, adjustment circuitry that generates an adjusted timebase limit based on the initial timebase limit. A storage circuit in the second clock domain stores a local timebase. Update circuitry, coupled to an output of the storage circuit, generates an updated local timebase using a clock signal in the second clock domain, wherein the updated local timebase is subject to the adjusted timebase limit.

In one embodiment, circuitry in the first clock domain operates according to a first clock signal, while circuitry in the second clock domain operates according to a second clock signal. A frequency of the second clock signal is greater than that of the first. Transfer circuitry in various embodiments may transfer the initial timebase limit from the first clock domain to the second clock domain during a synchronization event, which may occur once every N cycles of the first clock signal. The adjusted timebase limit may be updated responsive to a synchronization event.

During operation, the local timebase in the second clock domain may be incremented in accordance with the second clock signal. The size of the increments may be adjusted responsive to a synchronization event. If the local timebase saturates (e.g., reaches an upper limit) prior to the synchronization event, the increment size may be reduced for a predetermined number of cycles. If the local timebase lags a lower limit at the synchronization event, the increment size may be increased.

In various embodiments, the local timebase may be provided to, e.g., a peripheral interface to be distributed to one or more peripheral devices.

BRIEF DESCRIPTION OF THE DRAWINGS

The following detailed description makes reference to the accompanying drawings, which are now briefly described.

DETAILED DESCRIPTION

Figure 1A:
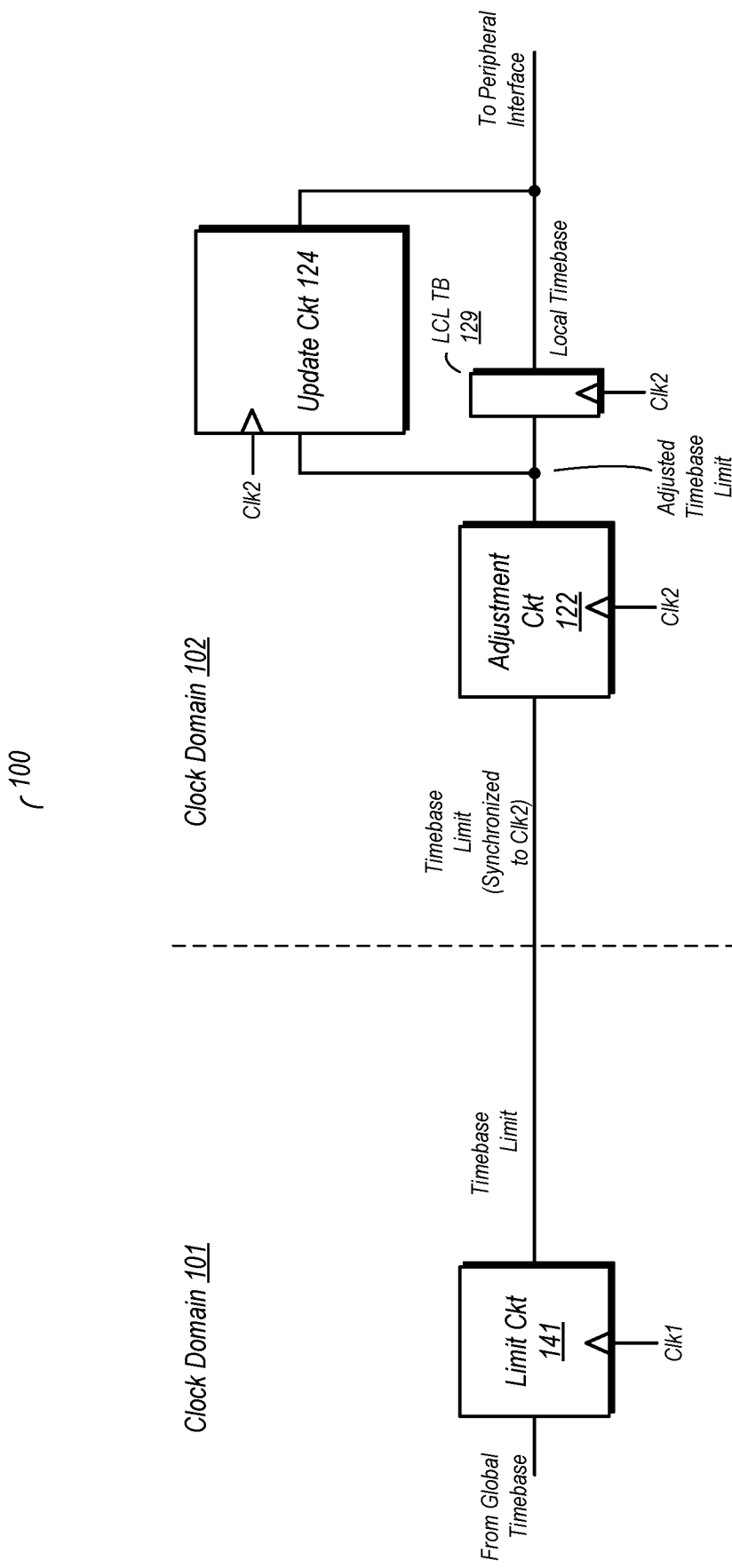
FIG. 1A is a block diagram of one embodiment of an apparatus for synchronizing a timebase across a clock domain.

Maintaining a timebase across multiple locations in an SoC can be a significant challenge. In a system having peripherals coupled to an SoC, this challenge is even greater due to, e.g., the latency of synchronizing the various local instances of a timebase with a global (e.g., reference) timebase. Further complicating matters in synchronizing local timebases to a global timebase is that the synchronization occurs across multiple clock domains having clock signals operating at different frequencies, and the higher frequencies are not always integer multiples of the lower ones. Since clock signals from some sources tend to drift over time, the problem of synchronizing local timebases to a global timebase may be even further complicated.

The present disclosure is directed to various embodiments of circuitry to synchronize and manage a timebase across time domains and methods of performing the same. In recognition of the various problems discussed in the previous paragraph, the present disclosure contemplates circuitry that, in a first clock domain, generates a timebase limit based on a global timebase. This timebase limit is then transferred from the first clock domain and synchronized into a second clock domain that may operate according to a clock signal having a higher frequency than that of the first domain. Since the ratio of clock signal frequencies between the first and second domains may be a non-integer value, the generation of the timebase limit may take this into account. The generation of the initial timebase limit further takes into account a delay incurred when synchronizing across a boundary between clock domains. In the second clock domain, an additional adjustment to the timebase limit is made to account for delays incurred in that domain. A local timebase, subject to the adjusted limit, is then stored in a storage element, and incremented by increment circuitry. The local timebase may also be provided to, e.g., a peripheral interface, and to peripheral devices coupled thereto.

The transfer of a timebase limit from the first clock domain to the second may occur once every N cycles (e.g., N=4) of the first clock signal. This transfer may be referred to as a synchronization event, or alternatively, an epoch. Accordingly, a new limit is provided every epoch, with the local timebase limits updated accordingly.

In some embodiments, increment adjustment circuitry may be provided to smooth transitions when the local timebase is lagging or leading the global timebase by a predetermined amount at the time of a synchronization event. The transfer of a timebase limit into the second clock domain and adjustment thereof may thus include setting maximum and minimum limits. If, at a synchronization event, the local timebase is lagging the global timebase by at least a predetermined amount in accordance with a minimum limit, the increment size may be increased for a certain time. If the local timebase has saturated (e.g., has reached at least its maximum limit) at a synchronization event, the increment size may be decreased for a certain time. This smoothing operation may bring the local and global timebases closer to one another while avoiding pauses or jumps in the local timebase. The present disclosure also contemplates decrement-based implementations when saturating at a lower bound.

The present disclosure further contemplates various mechanisms for correlating a global timebase on a host circuit, such as an SoC, to a timebase on a chip of a peripheral device. In one embodiment, a peripheral chip includes an interface circuit coupled to a corresponding interface on a host circuit. The interface circuit may conduct transactions with the host circuit to determine a relationship between a first local timebase stored on the peripheral chip and a global timebase stored on the host circuit. The first local timebase may be updated in response to the correlation. In response thereto, the interface circuit may further correlate the first local timebase to a second local timebase stored in a control circuit on the peripheral chip. Based on this second correlation, the second local timebase may be updated, and may subsequently be used to provide timestamps for operations carried out by a logic circuit on the peripheral chip. In performing the correlations, the interface clock circuit may factor in different clock frequencies of clock signals used in a first clock domain (on the host circuit side), a second clock domain (of the interface circuit), and a third clock domain (of the control circuit).

Various method and apparatus embodiments are now discussed in further detail below. Simplified and detailed embodiments of an apparatus for synchronizing and managing a timebase across a clock domain are discussed, followed by an explanation of the smoothing operation, including one apparatus embodiment for performing the same. Synchronization of a global timebase across an SoC is then discussed, followed by simplified and detailed embodiments of flow diagrams illustrating methods for performing the operations discussed herein. Thereafter, discussion of various aspects of transferring a global timebase across to a peripheral device follows, beginning with various apparatus embodiments, a procedure for correlating the global timebase with multiple local timebases on a peripheral chip, and concluding with a description of various method embodiments. The disclosure concludes with a discussion of example systems to which the various method and apparatus embodiments may be applied.

Example Embodiments of Circuitry for Synchronizing and Managing a Timebase Across Clock Domains:

FIG. 1A is a block diagram of a basic embodiment of an apparatus for synchronizing and managing a timebase across a clock domain. Clock domains 101 and 102, and the corresponding circuitry therein, may be implemented on an integrated circuit (IC), such as a system-on-a-chip (SoC). The circuitry shown in FIG. 1 may be used to transfer and synchronize a global timebase from a circuitry where it is initially generated, across a clock boundary, and to a peripheral interface to which peripheral circuits/devices may be connected.

In the embodiment shown, a limit circuit 141 is implemented in clock domain 101. Circuitry in clock domain 101 may operate in accordance with a first clock signal, Clk1, having a first frequency. In a second clock domain, clock domain 102, additional circuitry may be provided, with the additional circuitry operating in accordance with a second clock signal, Clk2, which has a second frequency. In one embodiment, the second frequency is greater than the first frequency. Clock domain 102 in the embodiment shown includes an adjustment circuit 122, an update circuit 124, and a local timebase register.

In the embodiment shown, limit circuit 141 is coupled to receive a global timebase from other circuitry implemented on the SoC where the global timebase is initially generated. Limit circuit 141 in the embodiment shown is configured to generate at least one initial timebase limit based on the received global timebase. The initial limit may be a value indicative of a time or range of times by which a local timebase is not to lead or lag the global timebase. The timebase limit value(s) may then be transmitted across the clock boundary between clock domain 101 and clock domain 102 to adjustment circuit 122.

Operating in clock domain 102, the adjustment circuit 122 is configured to generate an adjusted timebase limit based on the initial timebase limit received from limit circuit 141. In one embodiment, an upward adjustment of the initial timebase limit may be performed. The adjustment may be performed by adding a certain number of periods of the second clock signal, Clk2. The number of clock periods may correspond to an amount of time for synchronizing various signals crossing the clock boundary from clock domain 101 to clock domain 102.

The output from adjustment circuit 122 in the embodiment shown is an adjusted timebase limit, which is provided to and stored in local timebase register 129. On a cycle-by-cycle basis and in accordance with Clk2, the local timebase may be provided to a peripheral interface on the SoC/IC. The apparatus also includes update circuit 124, which forms a feedback loop around local timebase register 129, and is used to perform further updates to the local timebase. The updates performed by update circuit 124 include incrementing the local timebase with the passage of time between synchronization events. The amount of each increment to the local timebase may correspond to the period of the clock signal Clk2. Update circuit 124 may also perform additional adjustments when the local timebase is leading or lagging the global timebase. Additional details of this operation according to various embodiments are discussed below.

Figure 1B:
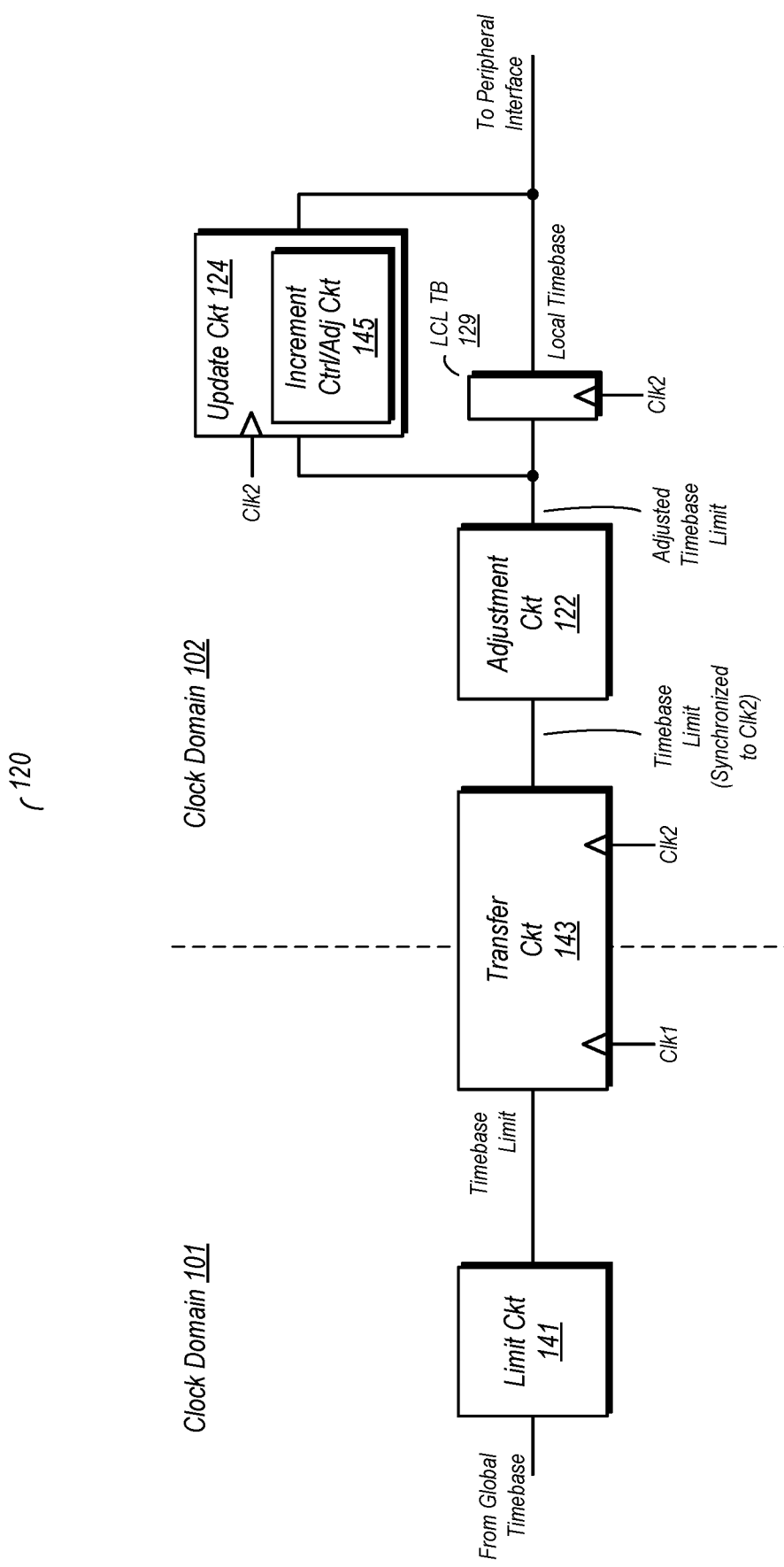
FIG. 1B is a block diagram of another embodiment of an apparatus for synchronizing a timebase across a clock domain.

FIG. 1B is a block diagram of another embodiment of an apparatus for synchronizing and managing a timebase across a clock boundary. In the embodiment shown, a portion of timebase synchronization circuit 100 is implemented in clock domain 101, while another portion is implemented in clock domain 102. Circuitry in clock domain 101 operates in accordance with the clock signal Clk1, while circuitry in clock domain 102 operates in accordance with the clock signal Clk2. In one embodiment, the frequency of Clk2 is greater than that of Clk1. Furthermore, the frequency of Clk2 in at least one embodiment is a non-integer multiple of the frequency of Clk1.

In the embodiment shown, timebase synchronization circuit 100 includes a limit circuit 141, which is coupled to receive a global timebase. The global timebase may be received from, e.g., a portion of a processor that is powered on at any time power is being provided to the processor or integrated circuit in which the processor is implemented (which may be referred to as an "always on" portion of the processor). The global timebase may serve as a reference for one or more local timebases that are implemented in the same system. Limit circuit 141 may generate a timebase limit value. The timebase limit value may be indicative of a value or a range more than which the local timebase is not to lead or lag the global timebase at a synchronization event. As will be discussed below, the generation of the limit may include some adjustment due to known latencies in the path in which it is transferred.

Transfer circuit 143 is coupled to receive the timebase limit from limit circuit 141 and synchronize it into clock domain 102. After synchronization, the timebase limit is forwarded to adjustment circuit 122 that performs additional adjustments to output an adjusted timebase limit. This circuitry further outputs a value to local timebase storage 129, the value serving as the initial local timebase value for the current synchronization period.

An output of local timebase storage 129 is coupled to update circuit 124, which performs multiple functions. Among these functions are incrementing the local timebase with the passage of time. The updated local timebase is fed back to the input of local timebase storage 129. Incrementing is performed in accordance with clock signal Clk2, although the increment size does not necessarily always match the period of Clk2.

Update circuit 124 also includes increment control/adjust circuit 145. At times during the updating, the local timebase may lead or lag the global timebase. This may occur for various reasons, such as clock drift. Furthermore, if the clock signals of clock domain 101 and clock domain 102 (Clk1 and Clk2) are not related by an integer multiple (e.g., Clk2 frequency is an integer multiple of Clk1), additional error may be introduced into the local timebase relative to the global timebase. Accordingly, the local timebase may, in some instances, be incremented faster than the global timebase. This can result in the local timebase leading the global timebase by an amount that is at or in excess of an upper limit, which may be referred to as saturating. In other instances, the local timebase may increment slower than the global timebase. This can cause the local timebase to lag by more than a specified amount, as specified by a lower limit. Accordingly, increment control/adjust circuit may adjust the size of increments used to update the local timebase responsive to one of these situations. This may be done, for example, at the time of a synchronization event.

In the case that the local timebase has saturated the global timebase as determined at a synchronization event, increment control/adjust circuit 145 may reduce the size of the increments for some specified time, e.g., a predetermined number of cycles. This may cause the local timebase to update slower than the global timebase, thereby allowing the latter to catch up with the former. In the case that the local timebase is lagging the global timebase at a synchronization event, increment control/adjust circuit 145 may increase the increment size for a specified time. This may allow the local timebase to update faster than, and thus catch up with, the global timebase. This behavior may be referred to as "smoothing." The smoothing behavior may be preferable to pauses or sudden jumps in the local timebase due to differences with the global timebase at the time of a synchronization event, as such pauses or jumps can cause errors in certain timing protocols.

Figure 1C:
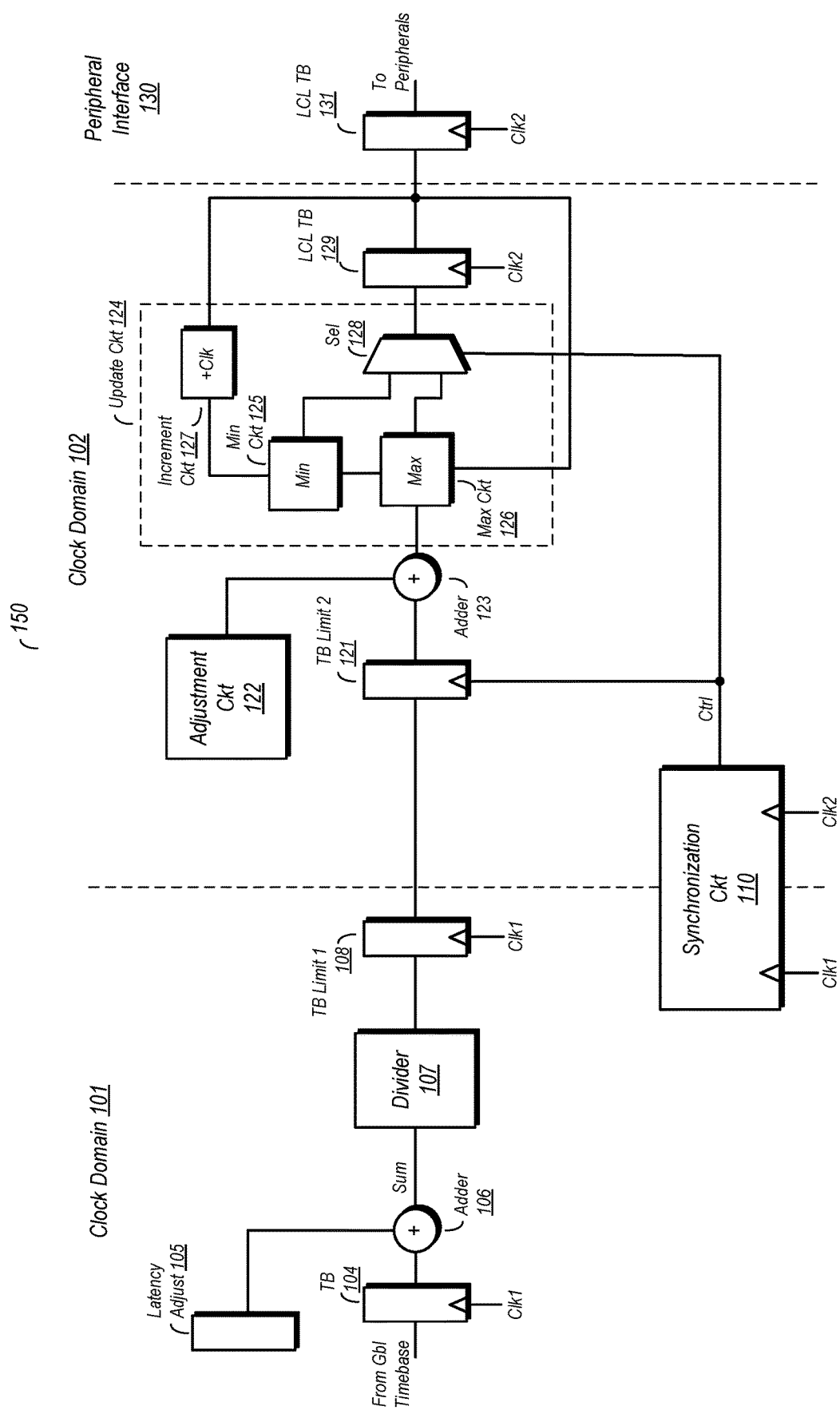
FIG. 1C is a block diagram of another embodiment of an apparatus for synchronizing a timebase across a clock domain.

FIG. 1C is a block diagram of another embodiment of an apparatus for synchronizing a timebase across a clock domain. Synchronization circuit 150 of FIG. 1B in the embodiment shown is a more detailed version of a synchronization circuit, and at least some of these details may be implemented into the various functional units of the circuit shown in FIGS. 1A and 1B. However, synchronization circuit 150 may also be considered to be an alternative to that which is shown of FIGS. 1A and/or 1B. While it is noted that synchronization circuit 150 shown here is arranged to provide a local timebase to a peripheral interface 130, this particular arrangement is not intended to limit the scope of this disclosure. More generally, this disclosure contemplates synchronization circuits as disclosed herein being implemented in a wide variety of applications, which can include the example shown here but can also include numerous other examples not explicitly disclosed herein.

In the embodiment shown, the circuit is implemented in two different clock domains, clock domain 101 and clock domain 102. In clock domain 1, a first timebase storage circuit 104 is coupled to receive a global timebase. The timebase storage circuit 104, as well as the other storage circuits in this embodiment, may be any suitable type of storage circuit, which may include (but is not limited to) clocked/controllable storage circuits. An output of timebase storage circuit 104 is coupled to provide an input to adder 106. Latency adjust circuit 105 is also coupled to provide an input to adder 106. In one embodiment, latency adjust circuit 105 may be programmable to store a value indicative of, or equivalent to, a number of cycles of the clock signal, Clk1. This value may account for at least some of the latency encountered when synchronizing the global timebase across the clock boundary in order to generate the local timebase. The global timebase and the value from latency adjust circuit 105 may be used by adder 106 to produce a sum. This sum may be divided by divider 107 to produce a timebase limit value that is a specified amount greater than (or ahead of) the global timebase. In one embodiment, divider 107 may divide the sum by a non-integer value, e.g., when the ratio of respective frequencies of Clk2 to Clk1 is also a non-integer value. The output of divider 107 is an initial timebase limit that is stored in timebase limit storage circuit 108.

Synchronization circuit 110 in the embodiment shown is coupled across the clock boundary between clock domain 101 and clock domain 102. One function of synchronization circuit 110 in the illustrated embodiment is to synchronize the transfer of the timebase limit, from timebase limit storage circuit 108, across the clock boundary into timebase limit storage circuit 121 in clock domain 102. Accordingly, synchronization circuit 110 is coupled to receive both Clk1 and Clk2, from clock domain 101 and clock domain 102, respectively. The output of synchronization circuit 110 is a control signal ('Ctrl') that is provided once within every N cycles of the first clock signal, Clk1, but is synchronized to the second clock signal, Clk2. The updating of the contents of timebase limit storage circuit 121 may coincide with a synchronization event which occurs once every N cycles of Clk1. Any suitable type of synchronizer may be used in the implementation of synchronization circuit 110.

Timebase limit storage circuit 121 is coupled to provide an input to adder 123, which is also coupled to receive another input from adjustment circuit 122. The sum output from adder 123 represents another adjustment of the timebase limit. In one embodiment, this limit is adjusted upward by a certain number of periods of Clk2 based on an amount of time consumed in synchronizing the control signal into clock domain 102 as well as the time to reflect the timebase limit into a subsequent storage circuit. The sum that is output from adder 123 is then received by update circuit 124.

Among the functions performed by update circuit 124 is the incrementing of the local timebase. Update circuit 124 in this particular embodiment includes maximum limit circuit 126 and a minimum limit circuit 125. These circuits may store current limits on the local timebase, and may also include comparison circuits for determining if these limits have been exceeded (e.g., saturated or lagging) during a current synchronization period. More generally, embodiments of an update circuit may include circuitry that implement one or more thresholds, e.g., first and second thresholds which are used as a basis of comparison in synchronizing a local timebase to a global timebase.

At a synchronization event, the sum output from adder 123 passes through maximum limit circuit 126 and select circuit 128 into local timebase register 129. The select circuit 128 is coupled to receive the control signal from synchronization circuit 110, which is asserted to select the output of maximum limit circuit 128 during a synchronization event. Based on the received adjusted timebase limit (from adder 123), the maximum and minimum limits are set, while local timebase storage circuit 129 is loaded with a local timebase value.

The output of local timebase storage circuit 129 is coupled to update circuit 124 by two feedback paths. A first of these feedback paths is to maximum limit circuit 126, while the second feedback path is to increment circuit 127. The local timebase may be incremented between synchronization events by increment circuit 127. The incremented value may pass through minimum limit circuit 125, through selection circuit 128, and back to the input of local timebase storage circuit 129. Additionally, each newly incremented value of the local timebase may be received by the maximum limit circuit 126 and minimum limit circuit 125. In maximum limit circuit 126, the current value of the local timebase may be compared to the current maximum limit to determine if it has saturated. Similarly, in minimum limit circuit 125, the current value of the local timebase may be compared to the current minimum limit to determine if it is lagging by more than a predetermined amount. The results of these comparisons may be used in the synchronization of the local timebase to the global timebase during synchronization events.

The output from local timebase storage circuit 129 may also be provided to another local timebase storage circuit 131 located in a peripheral interface 130. In this example implementation, the local timebase stored in local timebase storage circuit 131 can be distributed to, e.g., peripherals coupled to a peripheral bus that is in turn coupled to peripheral interface 130.

Smoothing Timebase Jumps:

As previously noted, it is possible that, at some synchronization events, the local timebase may lag or lead the global timebase by more than a specified amount. One embodiment of an update circuit 124 that may be used to bring the local and global timebases back into within a specified variation is now discussed here.

Figure 2:
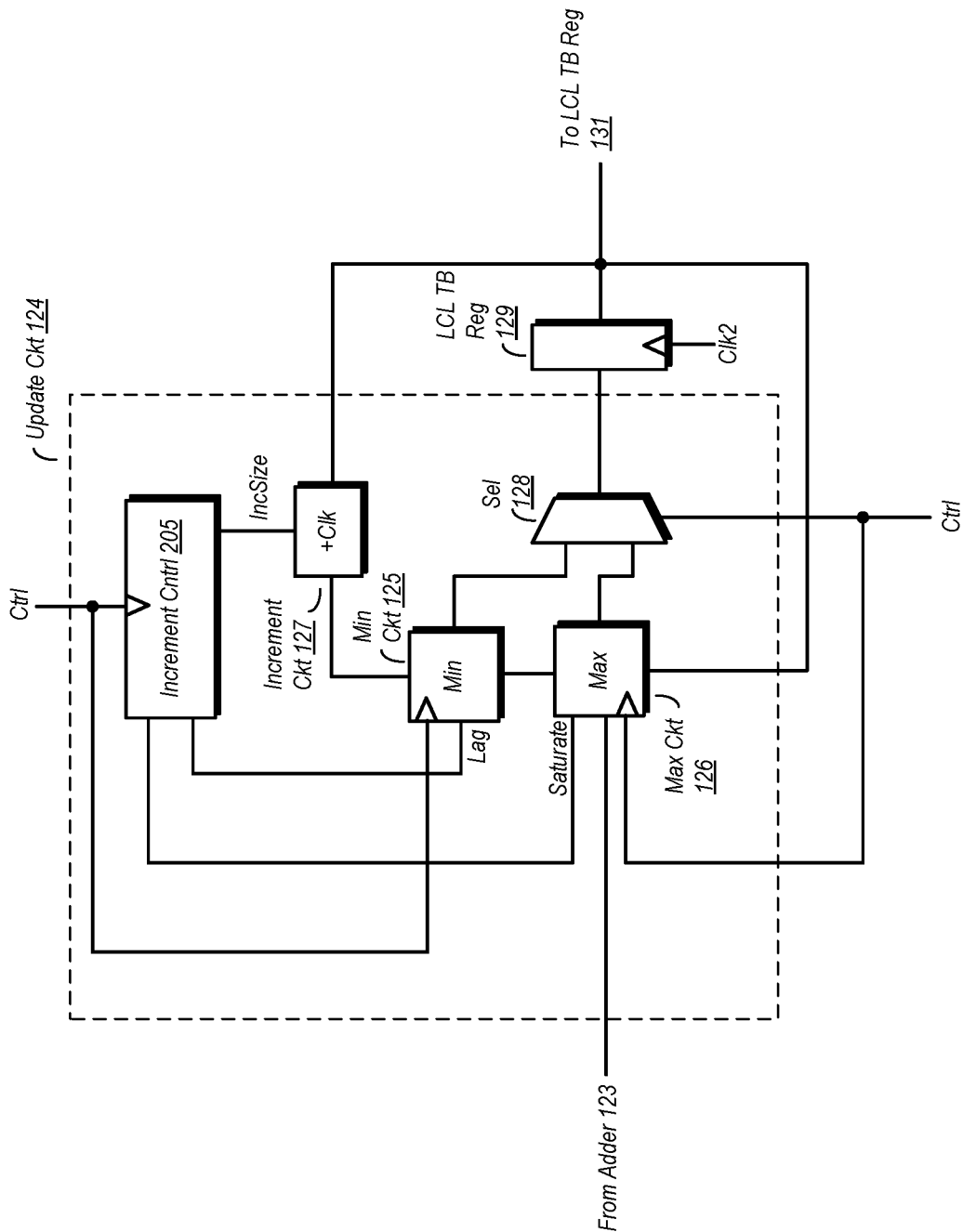
FIG. 2 is a block diagram of one embodiment of an update circuit configured to vary a size of the update increment.

FIG. 2 is a block diagram of one embodiment of an update circuit 124 arranged to perform a smoothing operation. The various components of update circuit 124 shown here and in FIG. 1B may perform largely similar functions. In this embodiment, update circuit 124 also includes a increment control circuit 205, which may control and adjust the size of the increments applied to the local timebase by increment circuit 127.

As previously noted, minimum limit circuit 125 and maximum limit circuit 126 may perform comparison operations on a current value of the local timebase, as incremented by increment circuit 127. Maximum limit circuit 126 may perform the comparisons to determine if the local timebase has saturated. If maximum limit circuit 126 determines that the local timebase has saturated, the 'Saturate' signal may be asserted and received by increment control circuit 205. Responsive to receiving this signal, increment control circuit 205 may adjust the increment size using the IncSize signal. This signal, when received by increment circuit 127, results in a corresponding adjustment to the increment size. For saturation conditions, the increment size may be reduced for a number of cycles. This in turn slows down the incrementing of the local timebase, allowing the global timebase to catch up.

If the local timebase is lagging beyond a certain limit, the minimum limit circuit 125 may assert the lag indication, 'Lag'. If the lag indication is asserted, increment control circuit 205 may cause increment circuit 127 to increase the size of the increment for a number of cycles, thereby causing faster updates to the local timebase. This may in turn allow the local timebase to catch up with the global timebase.

The adjustment of increment size in the embodiment shown may include adjustments performed responsive to synchronization events when the control signal is asserted. Thus, the increment size may initially be increased or decreased responsive to a synchronization event.

If neither the saturation or lag indications are asserted at a synchronization event, increment control circuit 205 may cause no adjustments to the increment size. In one embodiment, a standard increment size may be utilized when the local timebase is neither leading nor lagging the global timebase in excess of the maximum and minimum limits.

Figure 3:
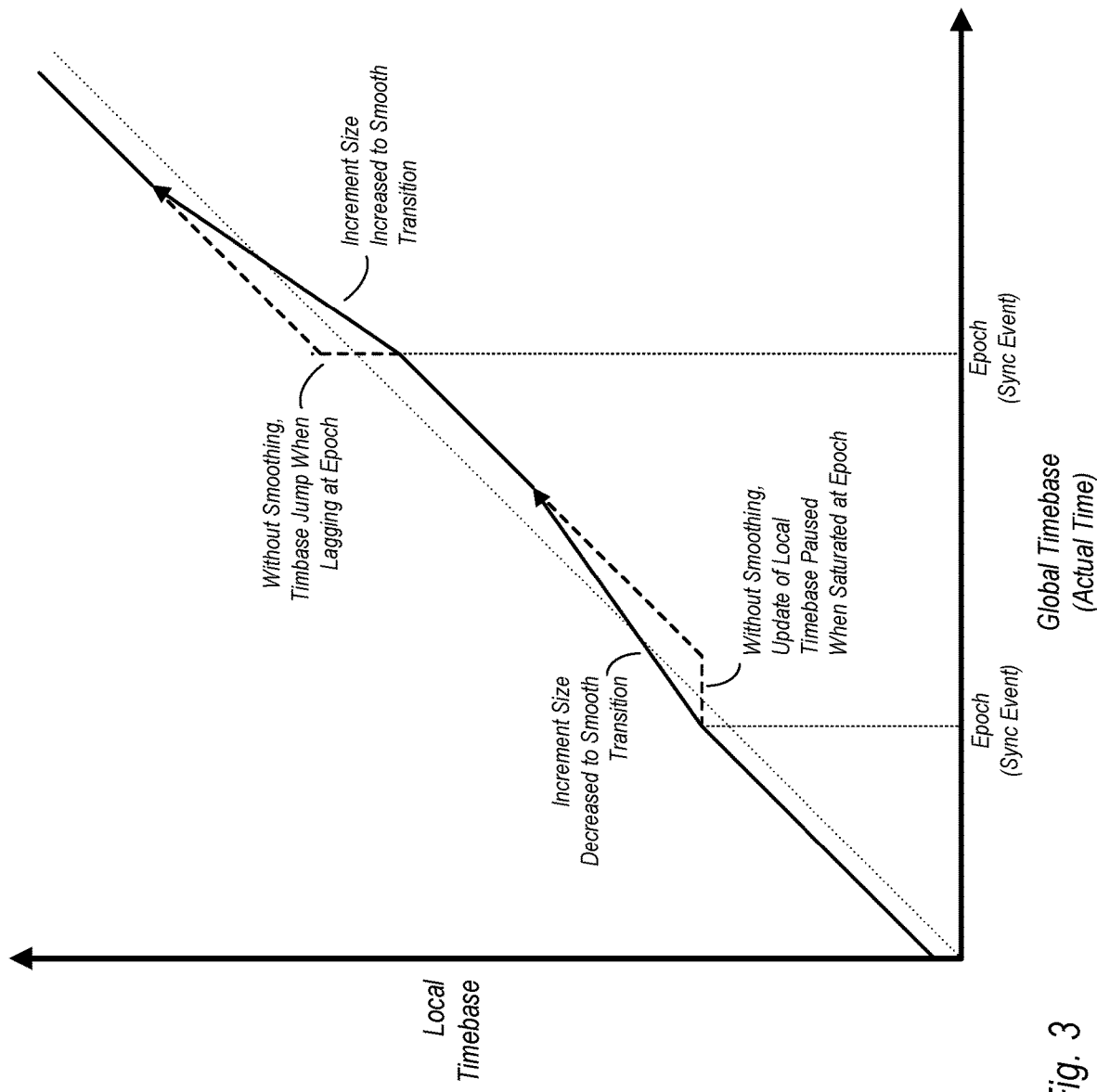
FIG. 3 is a graph illustrating operation of one embodiment of a increment adjustment circuit.

The smoothing operation is illustrated graphically in FIG. 3. In the illustrated graph, the dotted line at 45° represents a target synchronization value in which the local timebase and the global timebase match one another, while the solid lines within the graph space represent the local timebase. In the example shown, the local timebase is leading the global timebase, and is saturated at the first epoch, or synchronization event. In the absence of the smoothing operation, the local timebase would be paused for some amount of time to allow the global timebase to catch up. However, with the smoothing operation, the increment size of the local timebase is decreased for a certain amount of time after the epoch, thereby allowing a smooth transition.

At the next epoch, the local timebase is lagging the global timebase by an amount that is at or exceeds the minimum limit. Without the smoothing operation, the local timebase would be subject to a forward jump in time. Rather than coarsely adjusting the local timebase in this manner, the smoothing operation causes an increase to the increment size for a predetermined time as the local timebase catches up to the global timebase.

The present disclosure contemplates that the increment size adjustments may, in some embodiments, be subject to history of previous adjustments. More particularly, the adjustments to an increment size may be variable relative to previous adjustments, with the history of previous adjustments being taken into account. This may allow for further fine-tuning of the smoothing operation such that increment size adjustments may allow the local timebase to be closer to the global timebase at an epoch.

Figure 4:
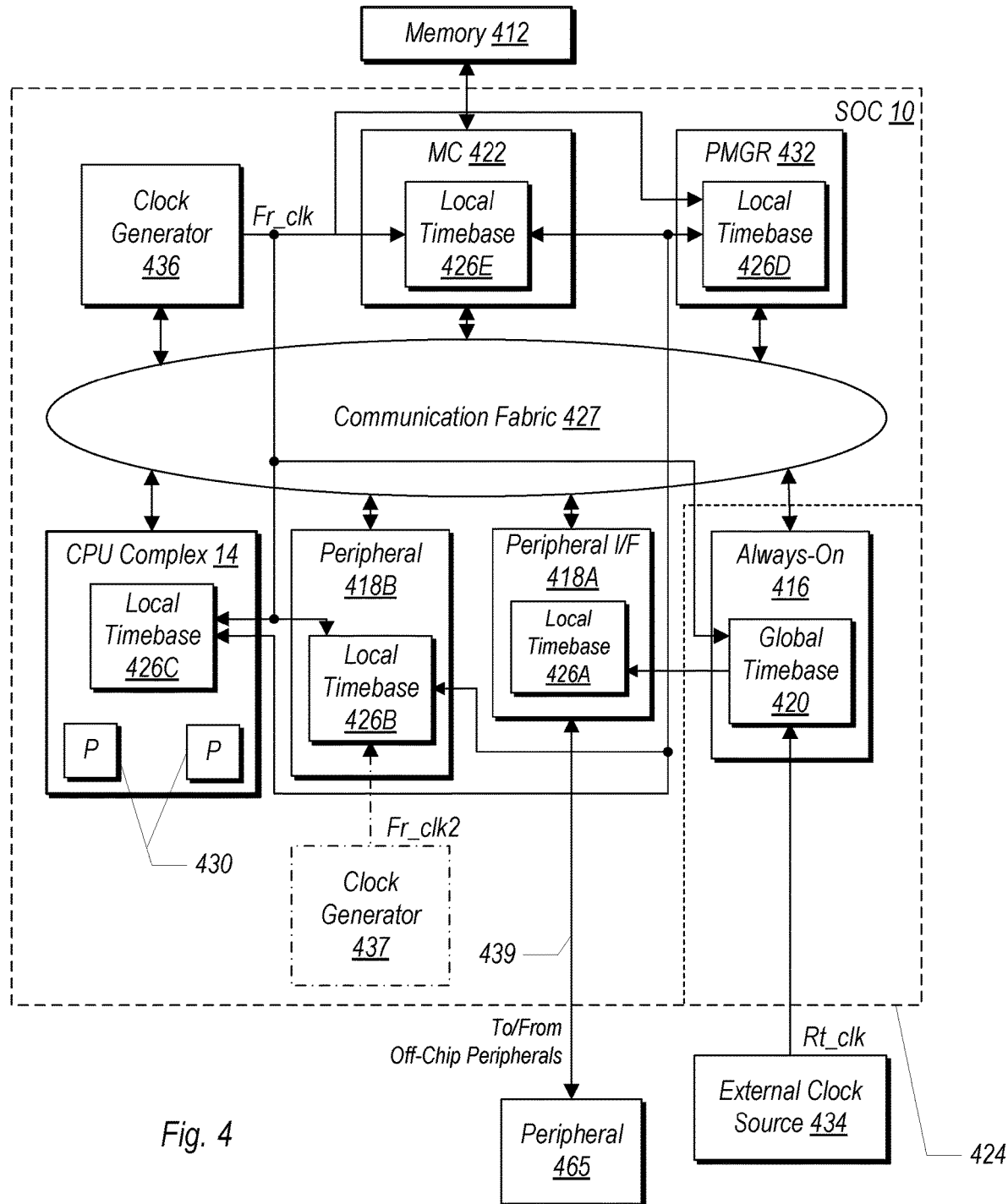
FIG. 4 is a block diagram of one embodiment of a system-on-a-chip (SoC) illustrating distribution of local timebases based on a global timebase.

System-On-a-Chip with Local Timebases Synchronized to Global Timebase:

Turning now to FIG. 4, a block diagram of one embodiment of an SoC 10 is shown coupled to a memory 412 and an external clock source 434. As implied by the name, the components of the SoC 10 may be integrated onto a single semiconductor substrate as an integrated circuit "chip." In some embodiments, the components may be implemented on two or more discrete chips in a system. However, the SoC 10 will be used as an example herein. In the illustrated embodiment, the components of the SoC 10 include a central processing unit (CPU) complex 414, an "always-on" component 416, peripheral interface 418A and peripheral component 418B (which may both be referred to more briefly as "peripherals"), a memory controller 422, a power manager (PMGR) 432, an internal clock generator circuit 436, and a communication fabric 427. The components 414, 416, 418A-418B, 422, 432, and 436 may all be coupled to the communication fabric 427. Peripheral interface 418A is additionally coupled to a peripheral bus 439 that may in turn be coupled to one or more off-chip peripheral devices 465. The memory controller 422 may be coupled to the memory 412 during use. The always-on component 416 may be coupled to the external clock source 434. In the illustrated embodiment, the CPU complex 414 may include one or more processors (P 430 in FIG. 4). The processors 430 may form the CPU(s) of CPU complex 414 within the SoC 10. In some embodiments, a second internal clock generator circuit 437 may be included and may be coupled to one or more local timebases (e.g. the local timebase 426B in FIG. 4). In such an embodiment, the local timebase 426B may not be coupled to the clock generator circuit 436. Multiple additional clock generator circuits may be included in still other embodiments.

Various components in the SoC 10 may have access to a timebase to determine time. Timebases may be used to generate timestamps for events (so that the temporal order of events may be ascertained, for example, or so that a given event may be associated with a particular real time (wall clock time). Timebases may be used to provide time to applications (e.g. to display for a user, for example, or to allow for time-based notifications such as alerts or alarms). Timebases may be used to measure elapsed time (e.g. to schedule execution of tasks in a multi-tasking operating system). In general, a timebase may be any measure of time. In an embodiment, a timebase may be a value that represents time at a certain granularity (e.g. the least significant digit may represent a specific amount of time). Some of the least significant digits may not actually be implemented (e.g. if the timebase value measures time at a higher granularity than clocks in the SoC 10 may permit). In other embodiments, the timebase value may measure ticks of a clock in the SoC 10. Based on the frequency of the clock, real time may be calculated.

The components that use the timebase may include local timebase circuits (e.g. the local timebase circuits 426A-426E in the CPU complex 414, the peripheral 418A, the memory controller 422, and the PMGR 432 in FIG. 4). In an embodiment, a component may have multiple local timebase circuits (e.g. there may be a local timebase circuit 426A-426E for each CPU 430 in the CPU complex 414) and/or multiple components may share a local timebase circuit 426A-426E. A global timebase circuit 420 in the always-on component 416 may be configured to synchronize the local timebases maintained by the local timebase circuits 426A-426E. In some embodiments, the global timebase circuit 420 may also maintain a global timebase.

The clock generator 436 may be configured to generate a relatively high frequency clock (Fr_clk) that may be used to update the local timebases (and optionally the global timebase, if included). Thus, the Fr_clk is coupled between the clock generator 436, the local timebase circuits 426A-426E, and optionally the global timebase circuit 420. The clock generator 436 may have any design and configuration, such as a phase-locked-loop (PLL), delay-locked-loop (DLL), etc. Generally, the clock generator 436 may be subject to various sources of inaccuracy that lead to variation in the clock frequency of the Fr_clk during use. For example, the circuitry in the clock generator 36 may be subject to variation due to temperature changes, supply voltage variation that changes delays in the circuitry, jitter, noise, etc. The supply voltage variation may include both transient variation due to noise, load, etc., and intentional variation such as dynamic voltage changes during use. The frequency of the Fr_clk may drift over time, running faster and/or slower than the desired frequency. Thus, there may be error in the local timebases.

Based on circuit analysis, empirical data, and/or simulations, the frequency variation may be determined to be within a range around the desired frequency. The desired frequency (i.e. the frequency expected from the clock generator 436) may be referred to as the nominal frequency. A clock may be referred to as nominally having a given frequency, where it is known that there may be some variation around the nominal frequency. Clocks may be referred to as nominally having higher or lower frequency by comparing their nominal frequencies, knowing that variations can cause the frequencies to vary.

A lower frequency clock (Rt_clk) may be received on an input to the SoC 10 (e.g. for the external clock source 434). The external clock source 434 may be a "high quality" clock source such as, e.g., a crystal oscillator. Clock quality may be measured in a variety of ways, but may generally refer to a clock that experiences low variation during use. Thus, the Rt_clk may have lower variation during use than the Fr_clk, for example. That is, the range of variation in the clock frequency around the nominal frequency of the Rt_clk may be smaller than the range of variation in the Fr_clk.

Accordingly, synchronization events may be triggered from the Rt_clk to synchronize the local timebases (both to each other and to the correct timebase value). A synchronization event may be any communication that causes a synchronization of the timebases to occur. For example, the global timebase circuit 420 may be configured to assert a signal, triggered from the Rt_clk, to the local timebase circuits 426A-426C. The global timebase circuit 20 may also communicate the next timebase synchronization value based on the Rt_clk, so that the local timebases have the synchronization value for update. In an embodiment, the global timebase circuit 420 may trigger a synchronization event once each period of the Rt_clk signal. For example, the synchronization event may be triggered at an edge of the clock. The rising edge may be used as an example in this description, but the falling edge may also be used. The global timebase circuit 420 may also transmit the next timebase synchronization value responsive to an edge (e.g. the opposite edge to the synchronization event edge, or the falling edge for the rising edge example). Other embodiments may define the synchronization event as occurring once per multiple periods of the Rt_clk, or on each edge of the Rt_clk, as desired.

The next timebase synchronization value may be generated each synchronization period from the previous synchronization value and a value that depends on the ratio of the frequencies of the Fr_clk and the Rt_clk. The ratio may be a non-integer value, and thus the timebase may have an integer part and a fractional part in terms of Rt_clk cycles. For example, in one embodiment, the Fr_clk may be 24 megahertz (MHz) and the Rt_clk may be 32,768 Hz. In this example, the ratio is 24 MHz/32,768 Hz, or 46875/64 in simplest mathematical form. Accordingly, the difference between consecutive synchronization timebase values may be 46875, and each clock cycle of the Fr_clk may be an increment of 64 on the local time base. The fractional part may be 5 bits since each increment is 64, and the fractional part may be implemented or not implemented, as desired, in various embodiments. In some embodiments, the fractional part may be used to prevent the local timebase from drifting relative to a timebase derived from an external clock source. Thus, both the per-Fr_clk increment and the difference in consecutive synchronization values may be dependent on the ratio of the frequencies.

In an embodiment, at least one local timebase circuit 426A-426E is configured to capture the next timebase synchronization value transmitted by the global timebase circuit 420 and may compare the local timebase to the next timebase synchronization value as the local timebase is incremented within a given synchronization period. If the Fr_clk is operating at a higher frequency than expected, the local timebase may reach the next timebase synchronization value prior to the end of the synchronization period. One or more of the local timebase circuits 426A-426E may saturate the local timebase value at the next timebase synchronization value for the remainder of the synchronization period. Thus, the local timebase may not "get ahead" of the correct timebase value by more than the timebase will have at the end of the synchronization period. Additionally, in response to the synchronization event, the local timebase circuits 426A-426E may load the next timebase synchronization value (which may be a timebase limit, per FIGS. 1A-1C) into the local timebase (assuming that the local timebase hasn't reached the next synchronization value). The loading of the next timebase synchronization value may prevent the local timebase from getting "behind" the correct timebase by more than a synchronization period.

Any communication mechanism may be used to transmit the next timebase synchronization value from the global timebase circuit 20 to the local timebase circuits 426A-426E. In various embodiments, one or more of the local timebases 426A-426E may be coupled to global timebase 420 by an apparatus discussed above in reference to FIGS. 1A-1C, and more generally, as falling within the scope of this disclosure. Furthermore, the management of one or more of the local timebases 426A-426B may include performing a smoothing operation based on a difference between the local timebase and global timebase 420 as determined at a synchronization event.

While the illustrated embodiment shows one Fr_clk provided from the clock generator circuit 436 to the local timebase circuits 426A-426E and the global timebase circuit 420, other embodiments may have multiple sources of Fr_clk, such as the clock generator circuit 437 providing the Fr_clk2 to the local timebase circuit 426B, shown in dot-dash form in FIG. 4. In such an embodiment, the local timebase circuit 426B may not receive the Fr_clk from the clock generator circuit 36. In still other embodiments, there may be more internal clock generator circuits providing other Fr_clks to various local timebase circuits 426A-426E. The sources may be independent of each other, so that a phase and frequency of the clocks may differ in use.

As mentioned previously, increments may saturate at the next timebase synchronization value for a given synchronization period. Generally, saturating a value may refer to incrementing up to the value, but then holding the incremented result steady at the value even in the face of additional increments. Incrementing may generally refer to increasing a value by a standard increment during use. The standard amount may be one, in some embodiments, or any other integer or other value. In the example mentioned above, the increment may be 64. However, in some embodiments, the increment size may be varied in accordance with the smoothing operation discussed above.

In an embodiment, the always-on component 416 may be configured to remain powered up when other components of the SoC 10 (e.g. the CPU complex 414, the peripherals 418A-418B, and the PMGR 432) are powered down. More particularly, the always-on component 416 may be on whenever the SoC 10 is receiving power from an external power management unit (PMU). Thus, the always-on component is "always-on" in the sense that it may be powered on if the SoC 10 is receiving any power (e.g. at times when the device including the SoC 10 is in standby mode or is operating actively), but may not be powered on when the SoC 10 is not receiving any power (e.g. at times when the device is completely turned off). The always-on component 416 may support certain functions while the remainder of the SoC 10 is off, allowing low power operation. Additionally, the global timebase circuit 420 may continue to maintain the global timebase for the system, so that the global timebase need not be reinitialized at the next power up of the SoC 10.

In FIG. 4, a dotted line 424 separating the always-on component 416 from the other components may indicate an independent power domain for the always-on component 416. Other components, groups of components, and/or sub-components may have independent power domains as well. Generally, a power domain may be configured to receive supply voltage (i.e. be powered on) or not receive supply voltage (i.e. be powered off) independent of other power domains. In some embodiments, power domains may be supplied with different supply voltage magnitudes concurrently. The independence may be provided in a variety of fashions. For example, the independence may be provided by providing separate supply voltage inputs from the external PMU, by providing power switches between the supply voltage inputs and components and controlling the power switches for a given domain as a unit, and/or a combination of the above. There may be more power domains than those illustrated in FIG. 4 as well. For example, the CPU complex 414 may have an independent power domain (and each CPU processor 30 may have an independent power domain as well) in an embodiment. One or more peripheral components 418A-418B may be in one or more independent power domains in an embodiment.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SoC 10 as a whole may be referred to as powered up/down, etc. A component may be a predefined block of circuitry which provides a specified function within the SoC 10 and which has a specific interface to the rest of the SoC 10. Thus, the always-on component 16, the peripherals 18A-18B, and the CPU complex 414, the memory controller 422, and the PMGR 432 may each be examples of a component.

A component may be active if it is powered up and not clock gated. Thus, for example, a processor in the CPU complex 414 may be available for instruction execution if it is active. A component may be inactive if it is powered off or in another low power state in which a significant delay may be experienced before instructions may be executed. For example, if the component requires a reset or a relock of a phase lock loop (PLL), it may be inactive even if it remains powered. A component may also be inactive if it is clock gated. Clock gating may refer to techniques in which the clock to the digital circuitry in the component is temporarily "turned off," preventing state from being captured from the digital circuitry in clocked storage devices such as flops, registers, etc.

As mentioned above, the CPU complex 414 may include one or more processors 30 that may serve as the CPU(s) of the CPU complex 414 in the SoC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The CPU complex 414 may further include other hardware such as an L2 cache and/or an interface to the other components of the system (e.g. an interface to the communication fabric 427).

An operating point may refer to a combination of power supply voltage magnitude and operating frequency for the CPU complex 414, the always-on component 16, other components of the SoC 10, etc. The operating frequency may be the frequency of the clock that clocks the component. The operating frequency may also be referred to as the clock frequency or simply the frequency. The operating point may also be referred to as an operating state or power state. The operating point may be part of the programmable configuration data that may be stored in the always-on component 16 and reprogrammed into the components when reconfiguration occurs.

Generally, a processor may include any circuitry and/or microcode configured to execute instructions defined in an instruction set architecture implemented by the processor. Processors may encompass processor cores implemented on an integrated circuit with other components as a system on a chip (SoC 10) or other levels of integration. Processors may further encompass discrete microprocessors, processor cores and/or microprocessors integrated into multichip module implementations, processors implemented as multiple integrated circuits, etc.

The memory controller 422 may generally include the circuitry for receiving memory operations from the other components of the SoC 10 and for accessing the memory 12 to complete the memory operations. The memory controller 422 may be configured to access any type of memory 412. For example, the memory 412 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 422 may include queues for memory operations, for ordering (and potentially reordering) the operations and presenting the operations to the memory 412. The memory controller 422 may further include data buffers to store write data awaiting write to memory and read data awaiting return to the source of the memory operation. In some embodiments, the memory controller 422 may include a memory cache to store recently accessed memory data. In SoC implementations, for example, the memory cache may reduce power consumption in the SoC by avoiding reaccess of data from the memory 412 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 422.

The peripherals 418A-418B may be any set of additional hardware functionality included in the SoC 10. For example, the peripherals 418A-418B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SoC 10 (e.g. the peripheral 418B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 427 may be any communication interconnect and protocol for communicating among the components of the SoC 10. The communication fabric 427 may be bus-based, including shared bus configurations, cross bar configurations, and hierarchical buses with bridges. The communication fabric 427 may also be packet-based, and may be hierarchical with bridges, cross bar, point-to-point, or other interconnects.

The PMGR 432 may be configured to control the supply voltage magnitudes requested from the external PMU. There may be multiple supply voltages generated by the external PMU for the SoC 10. For example, there may be a supply voltage for the CPU complex 414, a supply voltage for the rest of the SoC, a supply voltage for the memory 412, etc. The PMGR 432 may be under direct software control (e.g. software may directly request the power up and/or power down of components) and/or may be configured to monitor the SoC 10 and determine when various components are to be powered up or powered down.

It is noted that the number of components of the SoC 10 (and the number of subcomponents for those shown in FIG. 4, such as within the CPU complex 414) may vary from embodiment to embodiment. There may be more or fewer of each component/subcomponent than the number shown in FIG. 4.

Figure 5A:
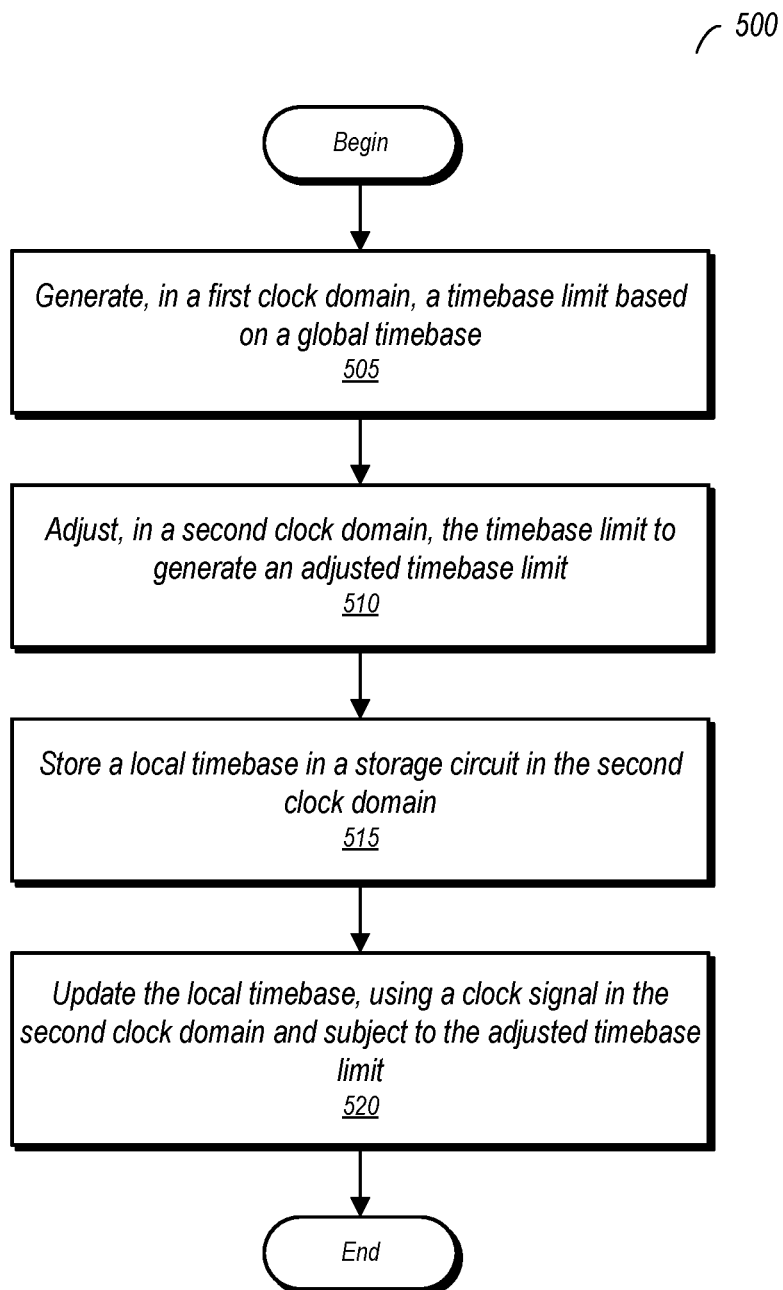
FIG. 5A is a flow diagram of one embodiment of a method for synchronizing a timebase across a clock domain.

Methods for Synchronizing Timebase Across Clock Domains:

FIG. 5A is a flow diagram of one embodiment of a method for synchronizing a timebase across a clock domain. Method 500 as shown in FIG. 5A may be performed using various embodiments of the hardware discussed above. Embodiments of systems that include hardware, firmware, and/or software capable of carrying out Method 500, but not explicitly discussed herein, may be considered to fall within the scope of this disclosure.

Method 500 includes generating, in a first clock domain, a timebase limit based on a global timebase (block 505). The method further includes adjusting, in a second clock domain, the timebase limit to generate an adjusted timebase limit (block 510). A local timebase is stored in a storage circuit in the second clock domain (block 515). Thereafter, the method includes updating the local timebase, using a clock signal in the second clock domain and subject to the adjusted timebase limit (block 520).

Figure 5B:
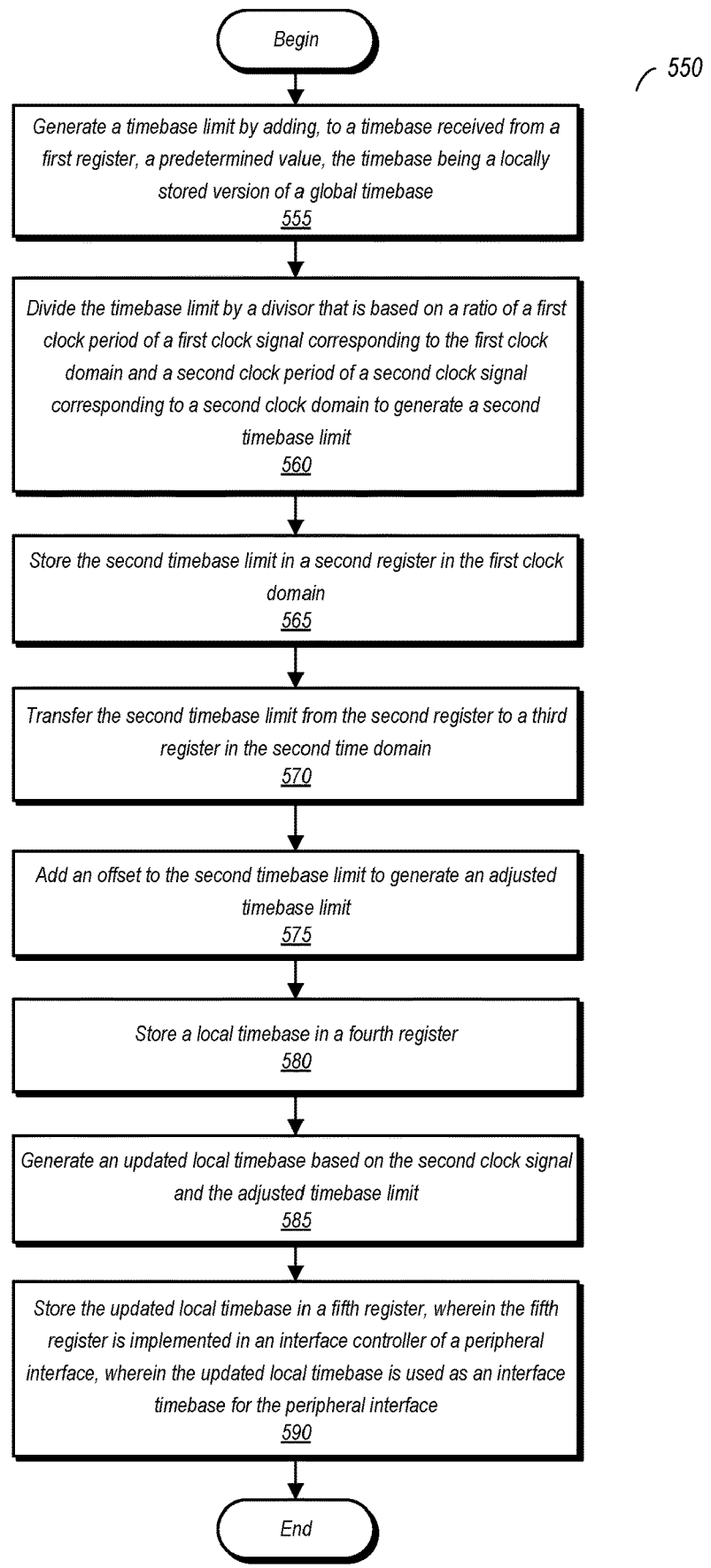
FIG. 5B is a flow diagram of another embodiment of a method for synchronizing a timebase across a clock domain.

FIG. 5B is a flow diagram of a more detailed embodiment of a method for synchronizing a timebase across a clock domain. As with Method 500 of FIG. 5A, Method 550 of FIG. 5B may be performed using various embodiments of the hardware discussed above. Embodiments of systems that include hardware, firmware, and/or software capable of carrying out Method 550, but not explicitly discussed herein, may be considered to fall within the scope of this disclosure. Furthermore, various portions of Method 550 may be incorporated into embodiments of Method 500, in any suitable combination.

Method 550 includes generating a timebase limit by adding, to a timebase received from a first register, a predetermined value, the timebase being a locally stored version of a global timebase (block 555). The method further includes dividing the timebase limit by a divisor that is based on a ratio of a first clock period of a first clock signal corresponding to the first clock domain and a second clock period of a second clock signal corresponding to a second clock domain to generate a second timebase limit (block 560), and storing the second timebase limit in a second register in the first clock domain (block 565). Thereafter, the method includes transferring the second timebase limit from the second register to a third register in the second time domain (block 570).

After the second timebase limit has been transferred into the second clock domain, the method continues by adding an offset to the second timebase limit to generate an adjusted timebase limit (block 575) and storing a local timebase in a fourth register (block 580). The method further includes generating an updated local timebase based on the second clock signal and the adjusted timebase limit (block 585). The local timebase may be used in an interface controller coupled to a peripheral bus. Accordingly, the method further includes storing the updated local timebase in a fifth register, wherein the fifth register is implemented in an interface controller of a peripheral interface, wherein the updated local timebase is used as an interface timebase for the peripheral interface (block 590).

In various embodiments, the methods disclosed herein may include synchronizing a control signal from the first clock domain to the second clock domain and capturing the second timebase limit in the third register using the control signal. With regard to the synchronization, the method includes capturing the second timebase limit in the third register once every N clock cycles of the first clock signal.

With regard to setting an initial timebase limit, adding the predetermined value in various method embodiments comprises adding a number of clock cycles to the global timebase, wherein the number of cycles corresponds to an average delay between the first register and the fifth register. With regard to the average delay, between the first and fifth registers (or more generally, storage circuits), the delay may encompass a portion of this path or the entirety thereof.

The first and second clock signals, being associated with different clock domains, may have different frequencies, and thus different clock periods. In some embodiments, the ratio of the first clock period to the second clock period is a non-integer value. The method may also include incrementing the local timebase, using the second clock signal, to generate the updated local timebase In some embodiments, a smoothing operation may be performed when the local timebase is at or beyond maximum and minimum limits. Accordingly, such embodiments of the method include incrementing the local timebase by increments smaller than a standard size increment for a first predetermined number of clock cycles responsive to saturating the local timebase prior to a first instance of a synchronization event, wherein the synchronization event synchronizes the local timebase to the global timebase. Such embodiments further include incrementing the local timebase by increments larger than the standard size increment for a second predetermined number of clock cycles responsive to the local timebase lagging a global timebase lower limit at a second instance of the synchronization event.

Figure 6:
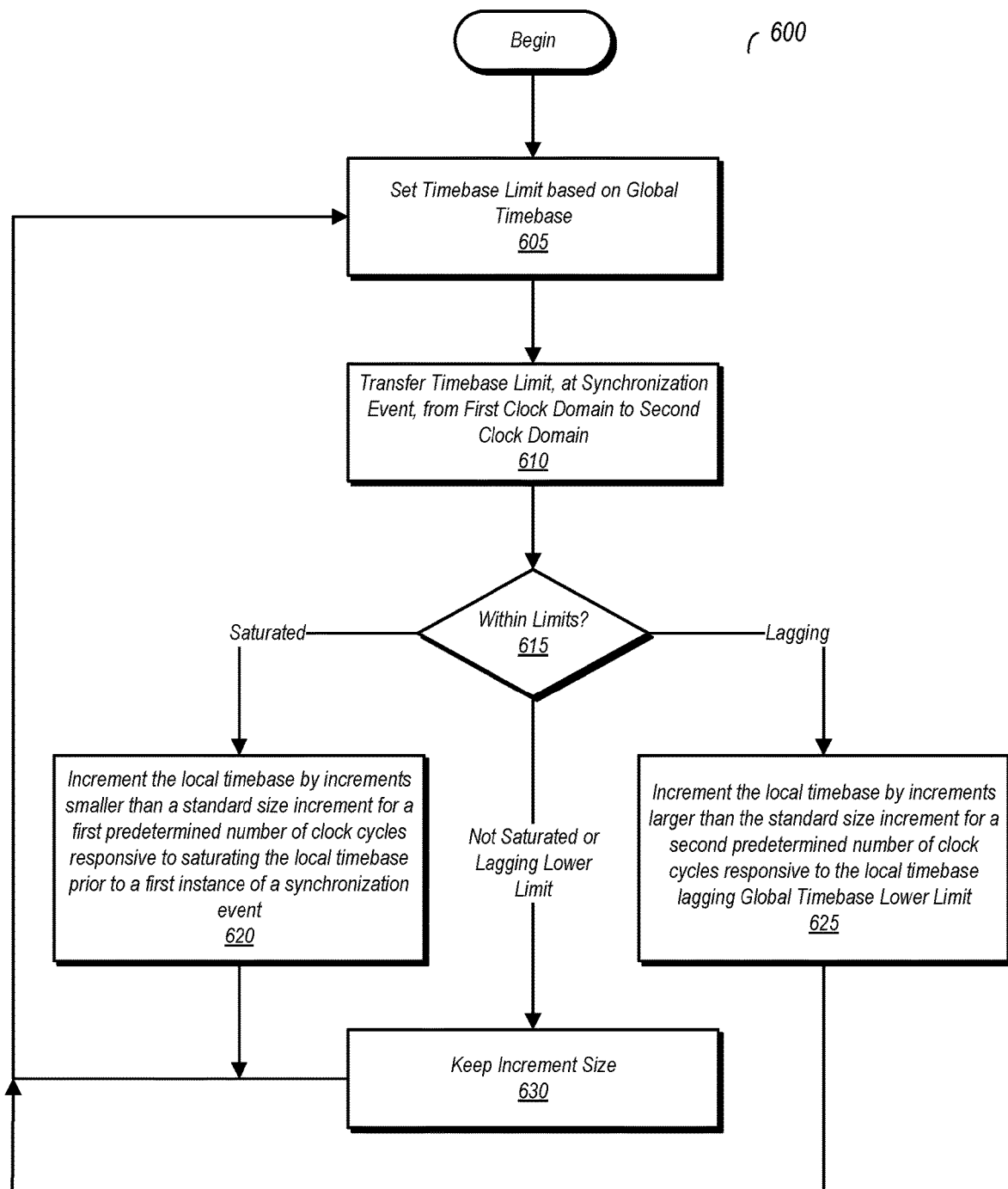
FIG. 6 is a flow diagram of one embodiment of an operation for smoothing transitions of a local timebase responsive to synchronization events.

Method for Smoothing Timebase Jumps:

FIG. 6 is a flow diagram of one embodiment of an operation for smoothing transitions of a local timebase responsive to synchronization events. Method 600 may be performed by the various embodiments discussed herein that perform smoothing in the synchronizing of the local timebase to the global timebase when the former either saturates or lags by a specified amount at a synchronization event. Furthermore, any embodiment of a system implemented using hardware, software, and/or firmware to carry out Method 600 can be considered to fall within the scope of this disclosure.

Method 600 includes setting a timebase limit based on a global timebase (block 605). Thereafter, the method includes transferring the timebase limit, at a synchronization event (or epoch), from the first clock domain to the second clock domain (block 610). Based on a maximum and minimum level set at the previous synchronization event, a check is made to determine if the local timebase, at the time of the current synchronization event, is within limits (block 615).

If the local timebase, at the current synchronization event is neither lagging a minimum timebase limit or saturating a maximum timebase limit, the current increment size is kept (block 630). If, on the other hand, the local timebase at the synchronization event is determined to have saturated the maximum limit (e.g., leading the global timebase by at least a certain amount), method 600 includes incrementing the local timebase by increments smaller than a standard size increment for a first predetermined number of cycles (block 620). Incrementing the local timebase at smaller increments may reduce the amount of time that it leads the global timebase. If the local timebase is lagging by at least a certain amount at the synchronization even, method 600 includes incrementing the local timebase by increments larger than standard size for a second predetermined number of clock cycles (block 625). Increasing the increment size may cause the local timebase to catch up to the global timebase or, at minimum, reduce the amount that it lags.

Irrespective of the direction taken at decision block 615, method 600 may return to block 605 and repeat as long as operation continues.

Figure 7:
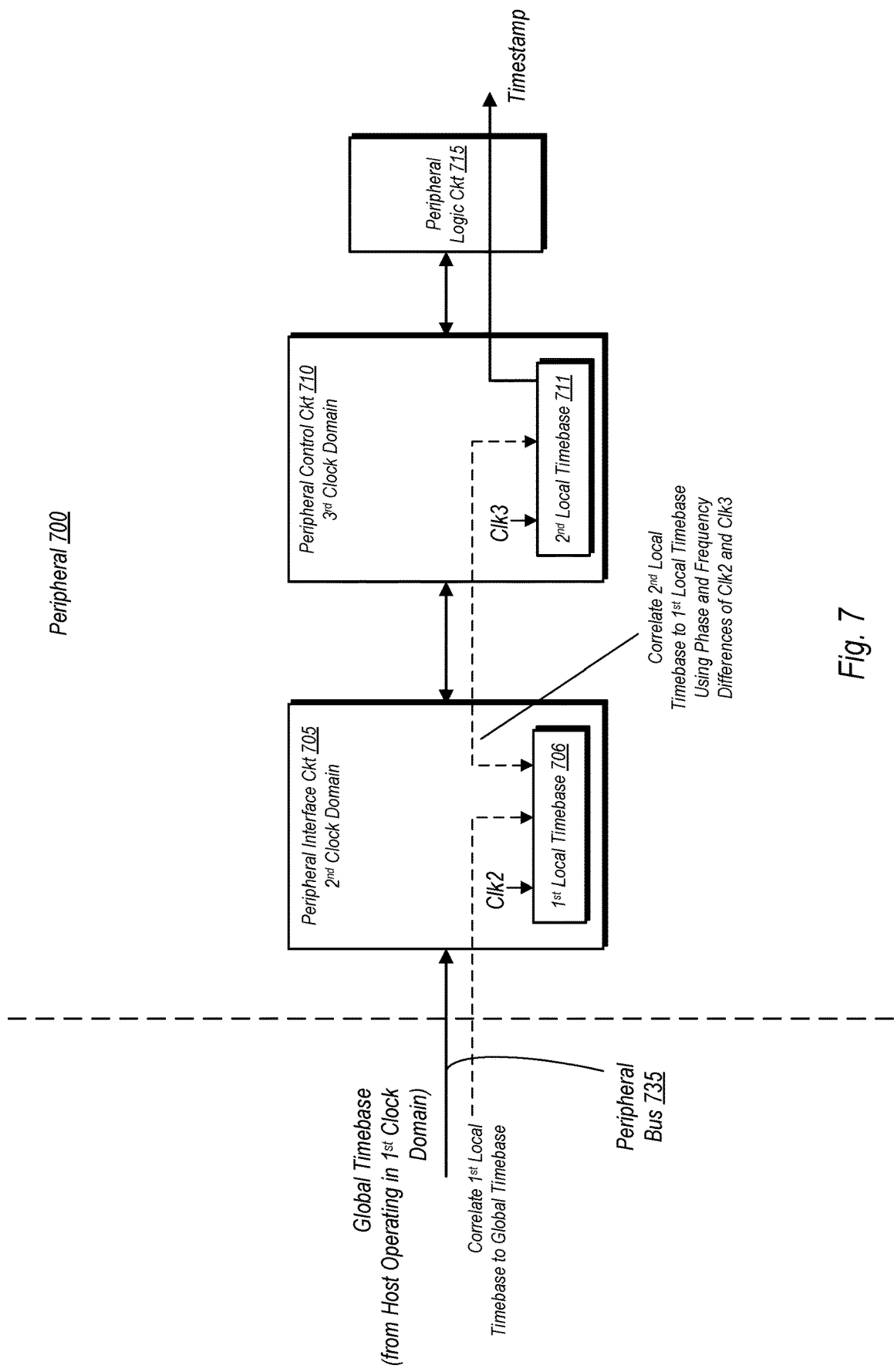
FIG. 7 is a block diagram illustrating one embodiment of a peripheral interface on a peripheral chip that includes circuitry for synchronizing a timebase from a host chip.

Peripheral Interface Timebase Synchronization:

Turning now to FIG. 7, a block diagram illustrating one embodiment of a peripheral interface on a peripheral chip that includes circuitry for synchronizing a timebase from a host chip is shown. In the embodiment shown, peripheral 700 is couple to receive, via a peripheral bus 735, a global timebase from a host circuit operating according to a first clock signal in a first clock domain. A host circuit according to the disclosure may include various embodiments of the circuits discussed above in FIGS. 1A to 4, which are capable of carrying out methods illustrated in FIGS. 5A, 5B, and 6. However, peripheral 700 may operate with host circuits other than those disclosed herein, implicitly or explicitly.

Peripheral 700 includes a peripheral interface circuit 705 that operates according to a second clock signal (Clk2) in a second clock domain. The frequency of the second clock signal may be different from that of the first clock signal. Accordingly, this difference may be accounted for when transferring the global timebase from the host circuit to peripheral 700. The global timebase may be received by peripheral interface circuit 705 and stored, as a first local timebase, in a first local timebase register 706.

Peripheral interface circuit 705 in the embodiment shown is coupled to a peripheral control circuit 710. The peripheral control circuit 710 as shown here operates in a third clock domain and in accordance with the clock signal Clk3. This clock signal is received by various circuitry in peripheral control circuit 710, including second local timebase register 711. Peripheral interface circuit 705 may from time to time perform operations to correlate the first local timebase to the second local timebase, thus updating the latter. By extension, the correlating of the second local timebase to the first local timebase also correlates the second local timebase to the global timebase on the host circuit.

The frequency of the clock signal Clk3 may be different from that of Clk2 in the second clock domain. In one embodiment, the frequency of Clk3 is greater than that of Clk2, with the frequency of Clk2 also being less than that of a clock signal in the first clock domain on the SoC/host circuit. Due to the different frequencies of these clock signals, phase differences are also present. These phase and frequency differences may be accounted for when correlating the second local timebase to the first local timebase.

Peripheral 700 in the embodiment shown also includes a peripheral logic circuit 715. This circuit may carry out at least some of the intended functions of peripheral 700. Some of the operations of peripheral logic circuit 715 may include the use of timestamps. These timestamps may be accessed from the second global timebase register 711. Since the second local timebase may be considered to be correlated to the global timebase, by way of the first local timebase, the second local timebase may be considered equivalent to the global timebase generated, stored and maintained on the host circuit.

Peripheral 700 in the embodiment shown may be one of a number of different peripheral types. For example, peripheral 700 may be part of a network interface (wired or wireless) that is capable of communicating with computers using some communications protocol. In another embodiment, peripheral 700 may include, e.g., Bluetooth interfaces, interfaces for additional storage/memory, user input devices, and so on. Generally speaking, peripheral 700 may be virtually any type of peripheral, and the disclosure herein is not intended to limit it to any specific type.

As noted above, there may be phase and frequency differences between the various clock signals. The peripheral interface circuit 705 in the embodiment shown may determine phase and frequency differences between the second and third clock signal as part of an operation to correlate the first and second local timebases. When the second timebase is used as a timestamp for operations carried out by peripheral logic circuit 715, the correlation with the first timebase may be accounted for. With regard to performing the correlations, peripheral interface circuit 705 may carry these out at various times. For example, if peripheral 700 is awakened from a sleep state, the correlation operation discussed herein may be carried out prior to commencing normal operations. In some embodiments, peripheral interface circuit 705 may carry out periodic correlations of the first and second local timebases. The present disclosure contemplates one possible embodiment where the peripheral interface circuit 705 carries out correlations at epochs, similar to those described above with reference to FIGS. 1A-6. However, the disclosure is not limited to such embodiments, as the peripheral as disclosed herein may be used in other environments and with other types of host circuits.

Figure 8:
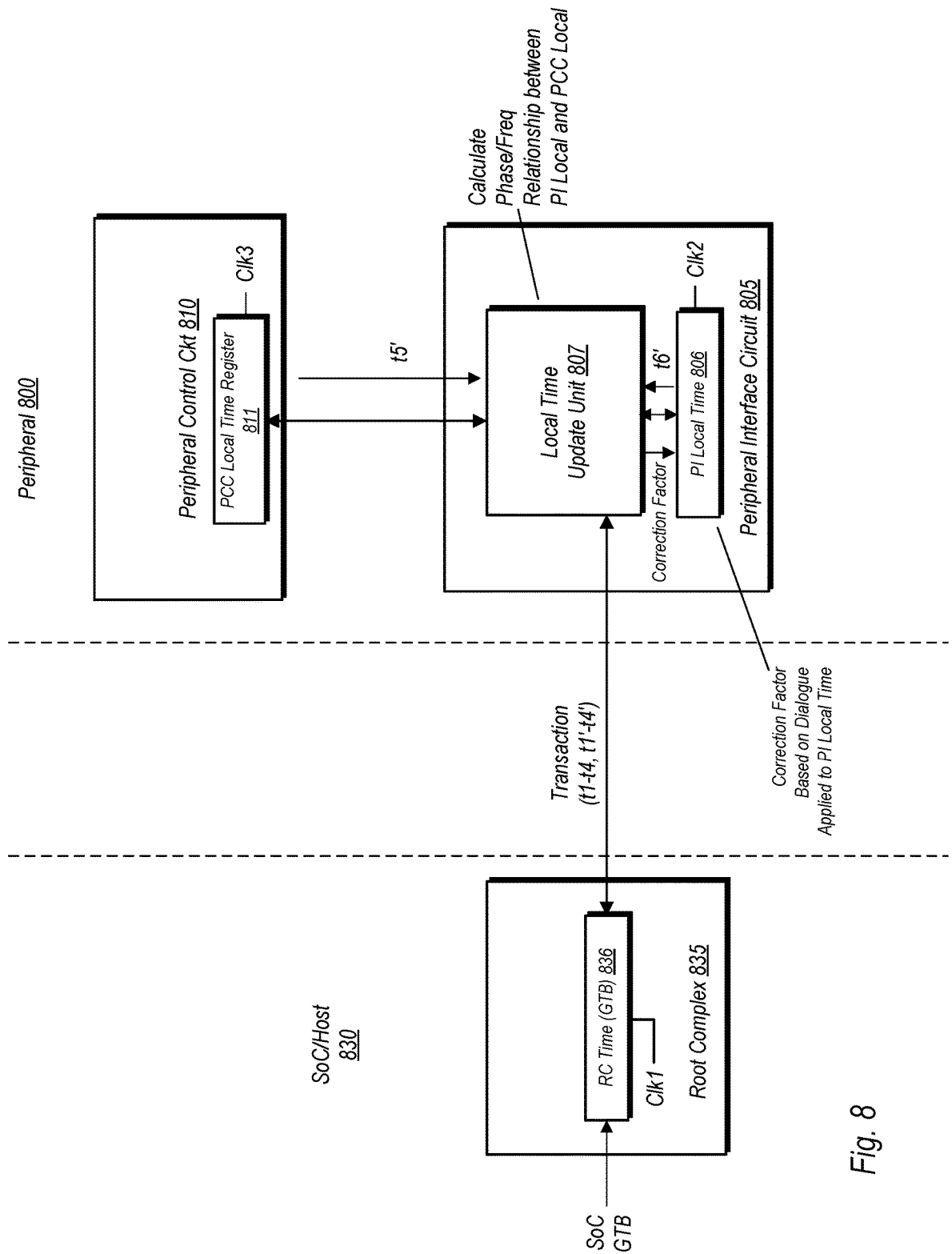
FIG. 8 is a block diagram illustrating one embodiment of a peripheral interface on a peripheral coupled to a host chip.

FIG. 8 is a block diagram illustrating one embodiment of a peripheral interface on a peripheral coupled to a host chip. In the embodiment shown, peripheral 800 is shown as being coupled to a SoC/Host circuit 830. On the Soc/Host circuit, a root complex (RC) 835 is provided as circuitry that facilitates interfaces to other types of devices off-chip, including peripheral 800. RC 835 in the embodiment shown is in a first clock domain and operates in accordance with a first clock signal, Clk1. An RC time register 836 in the embodiment shown is coupled to receive the global timebase, SoC GTB, from another location on SoC/Host 830. The global timebase stored in RC time register 836 may be incremented in accordance with the clock signal Clk1.

Peripheral 800 in the embodiment shown includes peripheral interface circuit 805 and peripheral control circuit 810. Although not shown here, peripheral 800 may also include logic circuitry (similar to logic circuit 715 of FIG. 7) to carry out the various ones of its intended functions. Peripheral interface circuit 805 in the embodiment shown includes PI (peripheral interface) local time register 806, which is configured to store a first local timebase, and a local time update unit 807, which includes circuitry that carries out the correlation of the various timebases pertinent to this particular figure. In various embodiments, local time update unit 807 may include storage for firmware and processing circuitry to execute instructions thereof as part of the correlation process. However, embodiments are also possible and contemplated in which all correlation functions are carried out by dedicated hardwired circuitry.

Peripheral control circuit 810 may include various types of circuitry used to carry out control functions of peripheral

800. Additionally, as shown in FIG. 8, peripheral control circuit 810 includes PCC (peripheral control circuit) time register 811, which is configured to store a second local timebase. Similar to the embodiment discussed in FIG. 7, the second local timebase may be accessed by peripheral 800 to provide timestamps for various operations. Furthermore, due to the correlations performed with the first local timebase and between the first local timebase and the global timebase, the second local timebase may effectively be a version of the global timebase as stored in PCC time register 811. In various embodiments, the correlation operations may include updating the second local timebase to match the global timebase as closely as possible. However, embodiments are also possible and contemplated where an offset is stored, the offset being indicative of a relationship of the second local timebase to the first local timebase. This offset may be provided whenever the second local timebase is accessed for a timestamp, with the adjustment performed at the time of access.

The correlation and update operations carried out by local time update unit 807 may include performing one or more transactions with root complex 835. These transactions may result in the generation of various timestamps, such as t1-t4 and t1'-t4' as shown here. Based on these timestamps, local time update unit 807 may calculate a correction factor that is then applied to adjust the first local timebase stored in PI local time register 806. After calculating the correction factor, timestamps t5' and t6' are obtained. The value t5' represents a value of the second local timebase while the value t6' represents a value of the first local timebase. Using these two values the relationship between the first and second local timebases may be determined by using them to determine phase and frequency differences. In one embodiment, the second local timebase may be updated based on this relationship, thereby matching it as close as possible to the global timebase on SoC/Host 830. A more detailed explanation of the transaction procedure is now provided with reference to FIG. 9.

Figure 9:
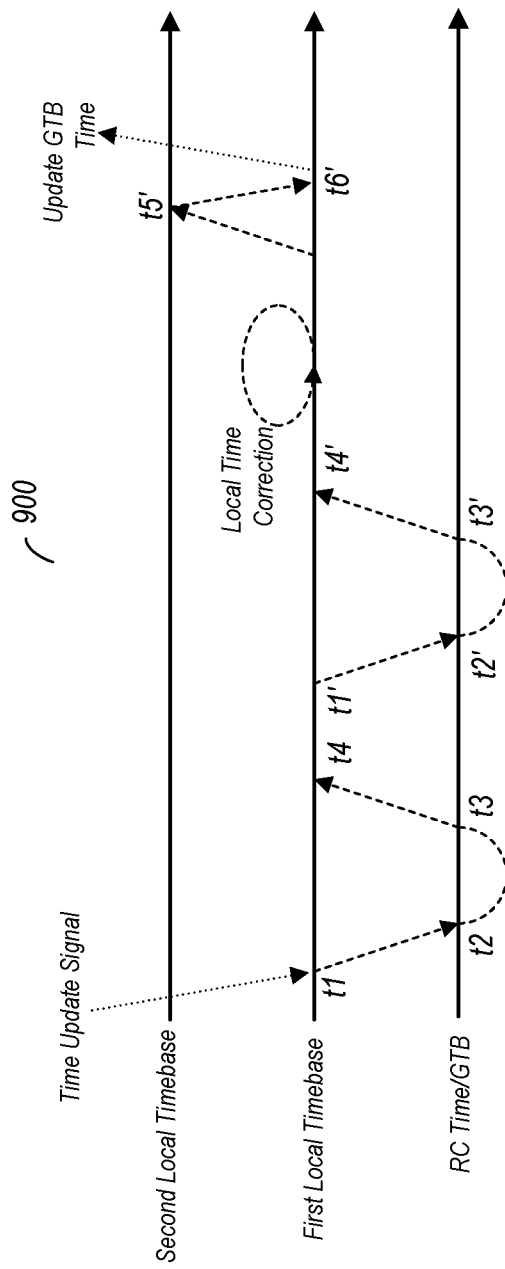
FIG. 9 is a diagram illustrating the correlating of local timebases on a peripheral chip with a timebase on a host chip for one embodiment of a peripheral chip.

FIG. 9 is a diagram illustrating the correlating of local timebases on a peripheral chip with a time base on a host chip for one embodiment of a peripheral chip. The procedure illustrated by FIG. 9 may be carried out in various embodiments of a peripheral interface circuit as discussed above and in accordance with this disclosure, e.g., using a local time update unit 807 of FIG. 8.

The illustrated procedure 900 includes operations involving the RC/global timebase stored on the SoC/Host side, the first local timebase, and the second local timebase. At t1, the peripheral transmits a query to the SoC/host, recording the time of the transmission. The query is received at time t2 on the SoC/host side, and a response is sent at time t3. Both of these times are recorded by the SoC/host, e.g., in the root complex. The response is received on the peripheral side at time t4, and recorded. This concludes a first transaction.

After the first transaction is complete, a second transaction is conducted, with the times t1', t2', t3' and t4' being recorded. With respect to the SoC/host side, the times t2' and t3' may be sent back to the peripheral side, along with the value of t3-t2. Using these values, the local time correction factor may be calculated on the peripheral side using the following formula:

$$\text{Local Time Correction} = t2' - (((t4-t1)-(t3-t2))/2) - t1'.$$

After calculating, the correction factor may be applied to update the first local timebase. This correction factor may effectively correlate the first local timebase to the global timebase stored and maintained on the SoC/host side.

Having calculated the correction factor, the first local timebase may be used to update the second local timebase, by determining a relationship between the two. Using the embodiment of FIG. 8 as an example, the local time update unit 807 may send a query to the PCC local timebase register 811 to obtain a value t5' of the second local timebase. The value t5' represents the time at which PCC local timebase register 811 received the query from local time update unit 807. The time at which the second local timebase is received by local time update unit 807 is designated as t6', and is referenced to the first local timebase. Using these values, the phase and frequency relationships may be calculated using the following formulas:

$$\text{Phase difference} = t6' - (t5'/C_f) + (N * \text{Cycle\_Clk2})$$

$$\text{Frequency Difference} = (t6' - \text{previous } t6')/((t5' - \text{previous } t5')/C_f),$$

where $C_f$ is a conversion factor indicating a frequency ratio of Clk3 and Clk2, and N is a number of cycles of the clock signal Clk2. It is noted that N is not necessarily an integer value, and may have a number of decimal places. Similarly, the conversion factor may also be a non-integer value.

Using the phase and frequency difference values calculated as noted above, the relationship between the first and second local timebases, and thus an offset between the two, is determined. The frequency difference may be used to determine how often the second local timebase is incremented relative to the first, while the phase difference may be used to determine relative times within the period of the second clock signal that the second local timebase is updated relative to the first local timebase. Based on this relationship, the second local timebase may be updated. The second local timebase, as noted above, may be considered to be a representation of the current global timebase and may thus be used for timestamps in operations carried out by the corresponding peripheral device.

For accuracy, the determination of the correction factor (to update the first local timebase) and the calculation of the phase and frequency differences may be performed as soon as possible after completing the transactions. In this manner, the updating of both the first and second local timebases may more accurately reflect the global timebase from the host/SoC side.

Figure 10:
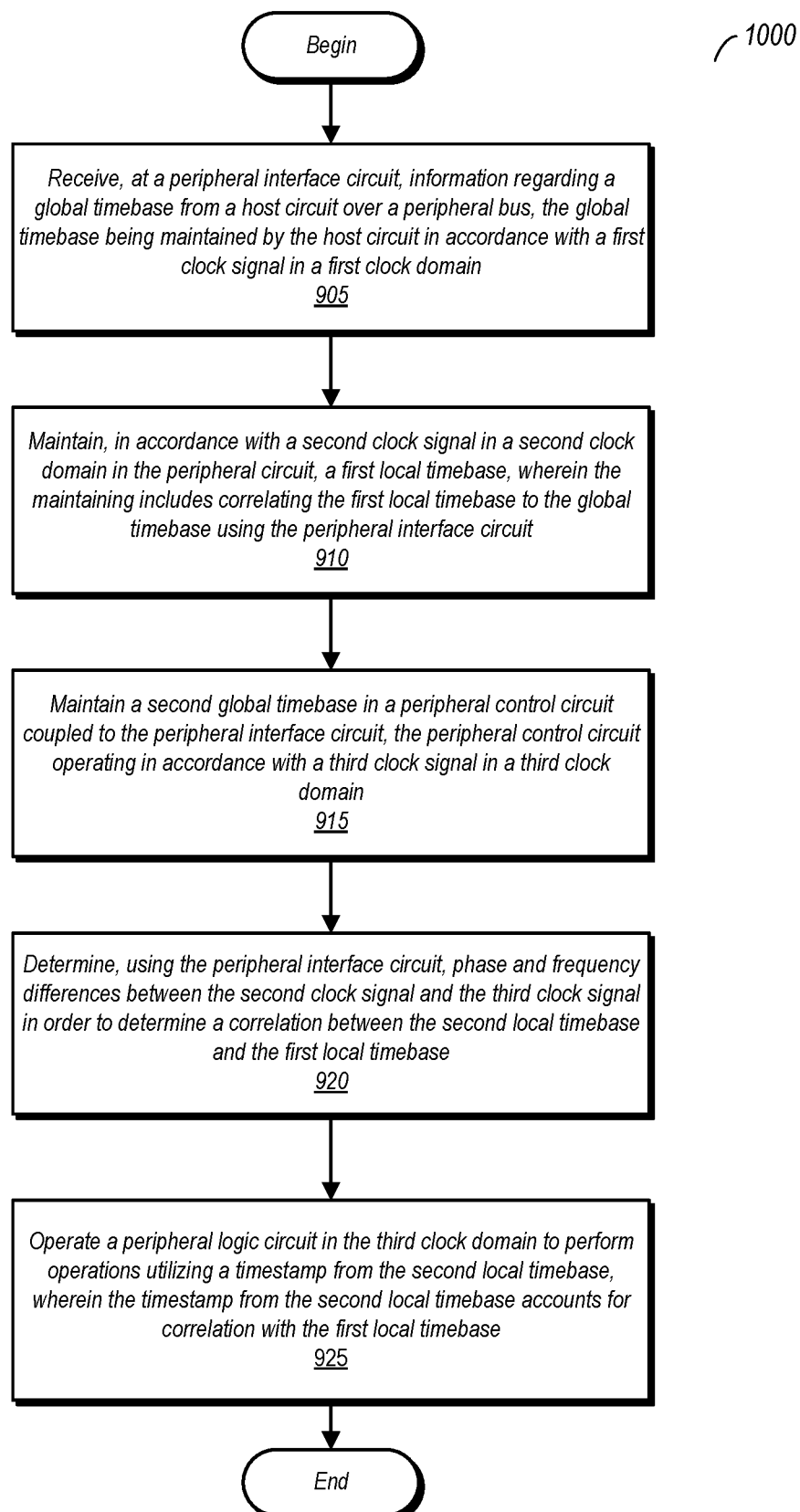
FIG. 10 is a flow diagram illustrating one embodiment of a method for correlating timebases in different clock domains.

Methods for Correlating Timebases in Different Clock Domains On a Peripheral Device Coupled to a Host Circuit:

FIG. 10 is a flow diagram of one embodiment of a method for correlating timebases on a peripheral device. The method embodiment illustrated by FIG. 10 includes correlating a first local timebase on the peripheral device to a global timebase on a host circuit coupled thereto, and further includes correlating the first local timebase to a second local timebase on the peripheral device. Method 1000 may be carried out by various embodiments of the hardware/circuitry discussed above, including those of FIGS. 7 and 8. Embodiments of a peripheral device capable of carrying out Method 1000 but not otherwise disclosed herein are also considered to fall within the scope of this disclosure.

Method 1000 includes receiving, at a peripheral interface circuit of a peripheral device, information regarding a global timebase from a host circuit over a peripheral bus, the global timebase being maintained by the host circuit in accordance with a first clock signal in a first clock domain (block 1005). The method further includes maintaining, in accordance with a second clock signal in a second clock domain in the peripheral circuit, a first local timebase, wherein the maintaining includes correlating the first local timebase to the global timebase using the peripheral interface circuit (block 1010) and maintaining a second global timebase in a peripheral control circuit coupled to the peripheral interface circuit, the peripheral control circuit operating in accordance with a third clock signal in a third clock domain (block 1015). Method 1000 also includes determining, using the peripheral interface circuit, phase and frequency differences between the second clock signal and the third clock signal in order to determine a correlation between the second local timebase and the first local timebase (block 1020). The peripheral device also includes a peripheral logic circuit configured to carry out its intended functionality. Accordingly, the method further includes operating a peripheral logic circuit in the third clock domain to perform operations utilizing a timestamp from the second local timebase, wherein the timestamp from the second local timebase accounts for correlation with the first local timebase (block 1025).

In various embodiments, the method includes updating the second local timebase based on the correlation with the first timebase. Furthermore, embodiments of the method include conducting, using the peripheral interface circuit, one or more exchanges with the host circuit in order to correlate the first local timebase to the global timebase, and determining the correlation of the first local timebase to the second local timebase in response to completing the one or more exchanges.

Correlating the first and second local timebases includes reading a value of the second local timebase from the peripheral control circuit and reading a value of the first local timebase from the peripheral interface circuit. The correlating also includes calculating the phase difference between the second and third clock signals using a conversion factor and a number of cycles of the third clock signal corresponding to a signal transit time between the third clock domain and the second clock domain. Thereafter, the correlating the values of the first and second local timebases is based on the phase difference.

The correlating of the various timebases may be performed at various times. Embodiments of the method are possible and contemplated in which correlating the first and second local timebases, by the peripheral interface circuit, is performed in response to the peripheral device waking from a sleep state. Embodiments are further possible and contemplated that include periodically correlating the first and second local timebases when the peripheral device is operating in an active state.

Figure 11:
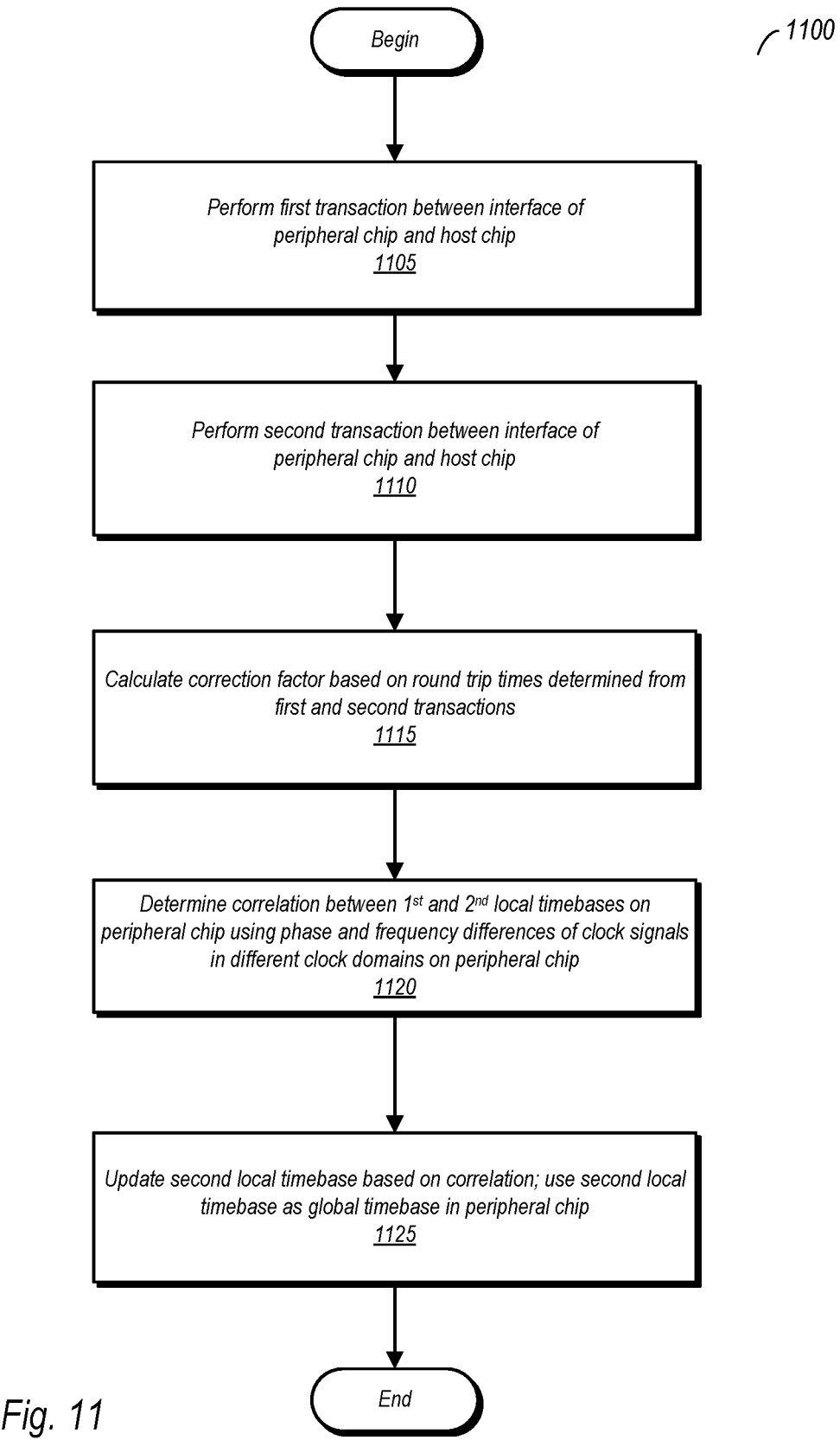
FIG. 11 is a flow diagram illustrating another embodiment of a method for correlating timebases in different clock domains.

FIG. 11 is a flow diagram of one embodiment of a method for correlating timebases on a peripheral device. The method embodiment illustrated by FIG. 11 includes correlating a first local timebase on the peripheral device to a global timebase on a host circuit coupled thereto, and further includes correlating the first local timebase to a second local timebase on the peripheral device. Method 1100 may be carried out by various embodiments of the hardware/circuitry discussed above, including those of FIGS. 7 and 8. Embodiments of a peripheral device capable of carrying out Method 1100 but not otherwise disclosed herein are also considered to fall within the scope of this disclosure.

Method 1100 includes performing a first transaction between an interface of a peripheral chip and a host chip (block 1105) and subsequently performing a second transaction between interface of the peripheral chip and the host chip (block 1110). The transactions may comprise communications in which the peripheral interface queries the host circuit and the host circuit responds by providing information to the peripheral interface. This information includes times at which a query was received from the peripheral interface, time a response was transmitted thereto, and an amount of time elapsed between the receipt of the query and the response. Using this information, the method continues with calculating a correction factor based on round trip times determined from first and second transactions (block 1115). A correlation is then determined between the first and second local timebases on the peripheral chip using phase and frequency differences of clock signals in the different clock domains thereon (block 1120). Based on this correlation, the method further includes updating the second local timebase based on correlation and using second local timebase as global timebase in peripheral chip (block 1125).

Figure 12:
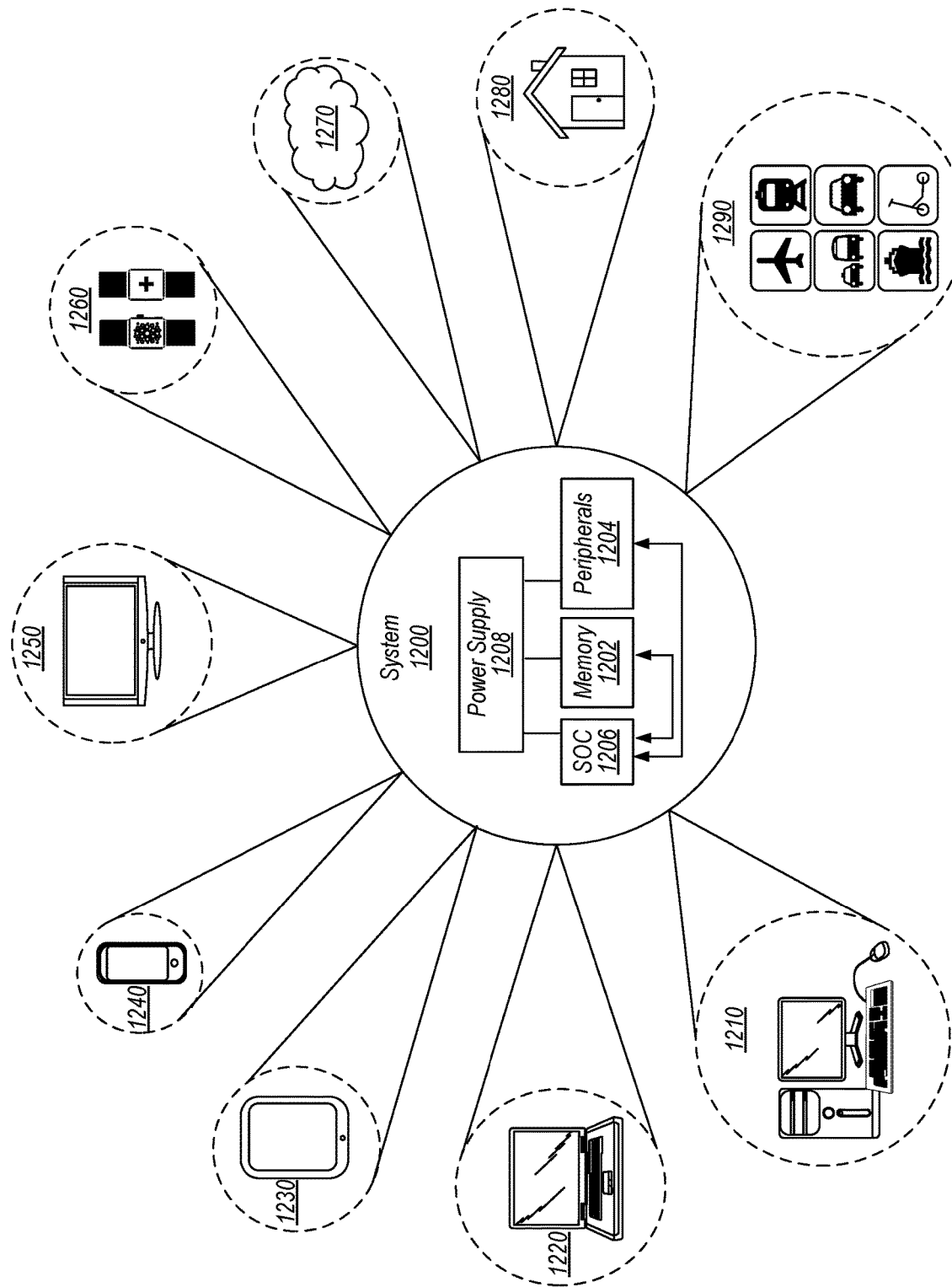
FIG. 12 is a block diagram of one embodiment of an example system.

Example System:

Turning next to FIG. 12, a block diagram of one embodiment of a system 1200 is shown that may incorporate and/or otherwise utilize the methods and mechanisms described herein. In the illustrated embodiment, the system 1200 includes at least one instance of a system on chip (SoC) 1206 which may include multiple types of processing units, such as a central processing unit (CPU), a graphics processing unit (GPU), or otherwise, a communication fabric, and interfaces to memories and input/output devices. In some embodiments, one or more processors in SoC 1206 includes multiple execution lanes and an instruction issue queue. In various embodiments, SoC 1206 is coupled to external memory 1202, peripherals 1204, and power supply 1208.

A power supply 1208 is also provided which supplies the supply voltages to SoC 1206 as well as one or more supply voltages to the memory 1202 and/or the peripherals 1204. In various embodiments, power supply 1208 represents a battery (e.g., a rechargeable battery in a smart phone, laptop or tablet computer, or other device). In some embodiments, more than one instance of SoC 1206 is included (and more than one external memory 1202 is included as well).

The memory 1202 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1204 include any desired circuitry, depending on the type of system 1200. For example, in one embodiment, peripherals 1204 includes devices for various types of wireless communication, such as Wi-Fi, Bluetooth, cellular, global positioning system, etc. In some embodiments, the peripherals 1204 also include additional storage, including RAM storage, solid state storage, or disk storage. The peripherals 1204 include user interface devices such as a display screen, including touch display screens or multi-touch display screens, keyboard or other input devices, microphones, speakers, etc.

System 1200 may include one or more different clock domains in which a timebase is stored and updated. Accordingly, system 1200 may include various embodiments of the various circuit embodiments discussed above, and/or may be capable of implementing the various method embodiments disclosed herein. This includes both the circuits and methods of FIGS. 1A-6, which are directed to updating a global timebase on an IC/SoC, as well as those of FIGS. 7-11, which are directed to transferring the global timebase to a peripheral chip and correlating the different timebases maintained thereon.

As illustrated, system 1200 is shown to have application in a wide range of areas. For example, system 1200 may be utilized as part of the chips, circuitry, components, etc., of a desktop computer 1210, laptop computer 1220, tablet computer 1230, cellular or mobile phone 1240, or television 1250 (or set-top box coupled to a television). Also illustrated is a smartwatch and health monitoring device 1260. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1200 may further be used as part of a cloud-based service(s) 1270. For example, the previously mentioned devices, and/or other devices, may access computing resources in the cloud (i.e., remotely located hardware and/or software resources). Still further, system 1200 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 12 is the application of system 1200 to various modes of transportation. For example, system 1200 may be used in the control and/or entertainment systems of aircraft, trains, buses, cars for hire, private automobiles, waterborne vessels from private boats to cruise liners, scooters (for rent or owned), and so on. In various cases, system 1200 may be used to provide automated guidance (e.g., self-driving vehicles), general systems control, and otherwise. These any many other embodiments are possible and are contemplated. It is noted that the devices and applications illustrated in FIG. 12 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a et of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
   limit circuitry implemented in a first clock domain operating according to a first clock signal, wherein the limit circuitry is configured to generate an initial timebase limit based on a global timebase;
   adjustment circuitry configured to, in a second clock domain operating according to a second clock signal, generate an adjusted timebase limit based on the initial timebase limit;
   a storage circuit in the second clock domain configured to store a local timebase; and
   update circuitry coupled to an output of the storage circuit and configured to, in the second clock domain, generate an updated local timebase, using a clock signal in the second clock domain and subject to the adjusted timebase limit.

2. The apparatus of claim 1, wherein the limit circuit includes a divider circuit configured to generate the initial timebase limit by dividing a first value by a ratio of a frequency of the first clock signal a frequency of a second clock signal, wherein the first value comprises a sum of the global timebase and an adjustment factor.

3. The apparatus of claim 2, wherein the ratio of the frequency of the first clock signal to the frequency of the second clock signal is a non-integer value.

4. The apparatus of claim 2, wherein the adjustment factor corresponds to a latency, measured in a number of periods of the first clock signal, for synchronizing the initial timebase limit across a boundary between the first clock domain and the second clock domain.

5. The apparatus of claim 1, wherein the adjustment circuit is configured to add an offset value to the initial timebase limit to generate the adjusted timebase limit, wherein the offset value is based on a number of periods of the second clock signal consumed in synchronizing a control signal from the first clock domain to a second clock domain.

6. The apparatus of claim 1, wherein the update circuitry includes an increment circuit configured to:
   increment the local timebase by increments smaller than a standard size increment for a first predetermined number of periods of the second clock signal responsive to saturating the local timebase prior to a first instance of a synchronization event, wherein the synchronization event synchronizes the local timebase to the global timebase; and increment the local timebase by increments larger than the standard size increment for a second predetermined number of periods of the second clock signal responsive to the local timebase lagging the global time at a second instance of the synchronization event.

7. The apparatus of claim 6, wherein the update circuit further includes:
a maximum limit circuit configured to determine if the local timebase is leading the global timebase by at least the adjusted timebase limit prior to the first instance of the synchronization event;
a minimum limit circuit configured to determine if the local timebase is lagging the global timebase by the adjusted timebase limit prior to the second instance of the synchronization event.

8. The apparatus of claim 1, further comprising a synchronization circuit configured to output a control signal synchronized to the second clock signal in the second clock domain.

9. The apparatus of claim 8, wherein the synchronization circuit is configured to, using the control signal, cause a synchronization event to synchronize the local timebase to the global timebase once every N cycles of the first clock signal.

10. The apparatus of claim 8, wherein the synchronization circuit is configured to synchronize the initial timebase limit into the second clock domain from the first clock domain.

11. A method comprising:
generating, in a first clock domain operating according to a first clock signal, a timebase limit based on a global timebase;
adjusting, in a second clock domain operating according to a second clock signal, the timebase limit to generate an adjusted timebase limit;
storing a local timebase in a storage circuit in the second clock domain; and
updating the local timebase, using a clock signal in the second clock domain and subject to the adjusted timebase limit.

12. The method of claim 11, further comprising:
incrementing the local timebase by increments smaller than a standard size increment for a first predetermined number of periods of the second clock signal in response to determining that the local timebase is leading the global timebase by at least the adjusted timebase limit at a first epoch; and
incrementing the local timebase by increments larger than the standard size increment for a second predetermined number of periods of the second clock signal responsive to the local timebase lagging the global timebase by at least the adjusted timebase limit at a second epoch.

13. The method of claim 11, wherein generating the timebase limit comprises:
adding a latency adjustment factor to the global timebase to produce a sum; and
dividing the sum by a ratio of a frequency of the first clock signal and a frequency of the second clock signal, wherein the ratio is a non-integer value.

14. The method of claim 13, wherein the latency adjustment factor is indicative of a delay, in terms of a number of cycles of the first clock signal, to generate the adjusted timebase limit in the second clock domain.

15. The method of claim 11, further comprising:
synchronizing a control signal from the first clock domain into the second clock domain; and
periodically asserting the control signal to cause the updating of the local timebase.

16. The method of claim 11, further comprising providing the local timebase from the storage circuit to a peripheral interface.

17. A system comprising:
limit circuitry implemented in a first clock domain operating according to a first clock signal, wherein the limit circuitry is configured to generate a timebase limit based on a global timebase;
transfer circuitry configured to transfer the timebase limit from the first clock domain into a second clock domain operating according to a second clock signal;
adjustment circuitry configured to, in the second clock domain, add an offset to the timebase limit to generate an adjusted timebase limit;
a local timebase register configured to, in the second clock domain, store a local timebase;
update circuitry coupled to an output of the local timebase register and configured to generate an updated local timebase based on the second clock signal and subject to the adjusted timebase limit; and
increment adjustment circuitry configured to:
responsive to saturating the local timebase, increment the local timebase by increments smaller than a standard size increment for a predetermined number of clock cycles; and
responsive to the local timebase lagging the global timebase at a time of a synchronization event, increment the local timebase by increments larger than the standard size increment for a predetermined number of clock cycles.

18. The system of claim 17, further comprising synchronization circuitry configured to synchronize transfer of the timebase limit from the first clock domain to the second clock domain.

19. The system of claim 18, wherein the synchronization circuitry is further configured to:
synchronize a control signal from the first clock domain to the second clock domain; and
cause a timebase limit register in the second domain to capture the timebase limit once every N cycles of the first clock signal.

20. The system of claim 17, wherein the limit circuitry includes:
a global timebase register configured to store the global timebase;
an adder configured to add a predetermined number of cycles of the first clock signal to the global timebase;
a divider configured to divide a sum output from the adder by a non-integer value; and
a limit register configured to store the timebase limit.

* * * * *